United States Patent [19]

Ayanoglu

[11] Patent Number: 5,719,883
[45] Date of Patent: Feb. 17, 1998

[54] ADAPTIVE ARQ/FEC TECHNIQUE FOR MULTITONE TRANSMISSION

[75] Inventor: Ender Ayanoglu, Red Bank, N.J.

[73] Assignee: Lucent Technologies Inc., Murray Hill, N.J.

[21] Appl. No.: 310,029

[22] Filed: Sep. 21, 1994

[51] Int. Cl.[6] .................. H03M 13/00; H04L 1/18
[52] U.S. Cl. .................. 371/35; 371/34; 371/32; 371/41; 370/69.1; 370/75; 370/120; 370/34
[58] Field of Search .................. 371/35, 34, 32, 371/41; 370/69.1, 75, 120, 34, 35; 375/58, 94.3, 347, 349

[56] References Cited

U.S. PATENT DOCUMENTS

| | | | |
|---|---|---|---|
| 4,796,260 | 1/1989 | Schilling et al. | 371/39 |
| 4,829,526 | 5/1989 | Clark et al. | 371/35 X |
| 4,849,976 | 7/1989 | Schilling et al. | 371/35 X |
| 5,010,553 | 4/1991 | Scheller et al. | 371/35 |
| 5,191,576 | 3/1993 | Pommier et al. | 370/18 |
| 5,280,498 | 1/1994 | Tymes et al. | 375/1 |
| 5,345,437 | 9/1994 | Ogawa | 370/13 |
| 5,400,347 | 3/1995 | Lee | 371/37.5 |
| 5,452,319 | 9/1995 | Cook et al. | 375/202 |
| 5,455,939 | 10/1995 | Rankin et al. | 371/40.1 |
| 5,457,712 | 10/1995 | Weerackody | 375/347 |
| 5,471,503 | 11/1995 | Altmaier et al. | 375/202 |
| 5,487,069 | 1/1996 | O'Sullivan et al. | 370/94.3 |

*Primary Examiner*—Reba I. Elmore
*Assistant Examiner*—McDievnel Marc

[57] ABSTRACT

Increased numbers of multipath transmission errors, that are detected by the performance of cyclic redundancy checking (CRC) over time and frequency on the words of a multitone transmission block that include mapped information bits, are correctable by forward error control as a result of the iterative performance of CRC over frequency on subblocks of the transmission block using retransmitted parity checking bits. A continuous record is maintained of the frequency channels that are detected as experiencing transmission errors in order to maximize the rate of data bit transmission on frequency channels that are likely to experience a reduced number of transmission errors.

43 Claims, 12 Drawing Sheets

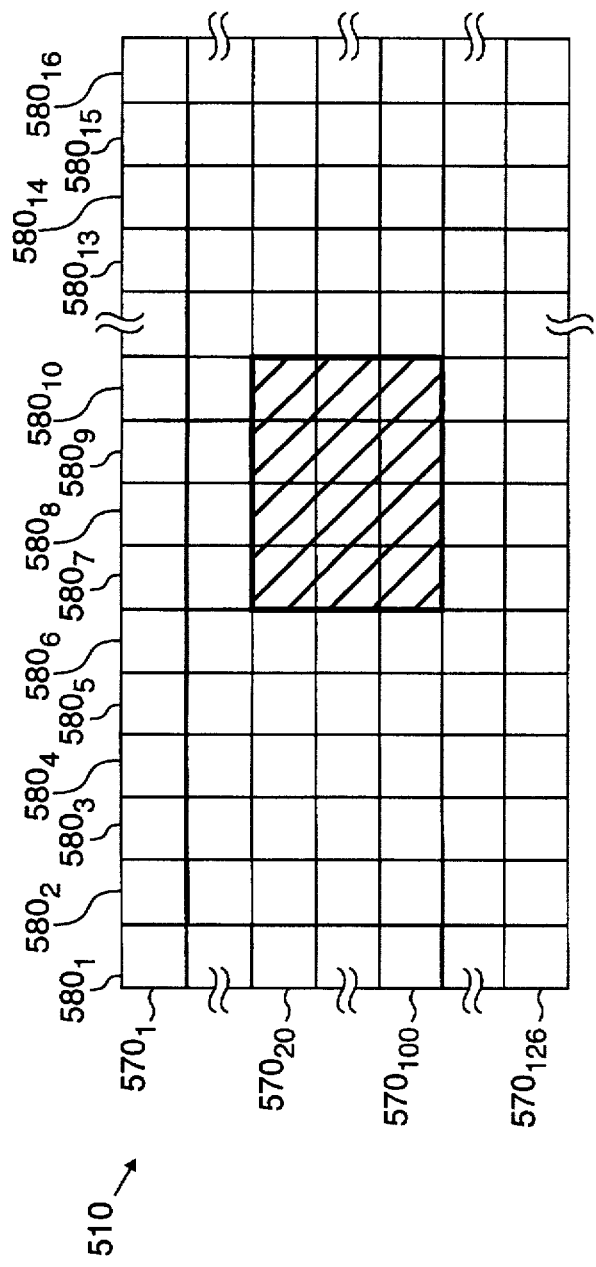
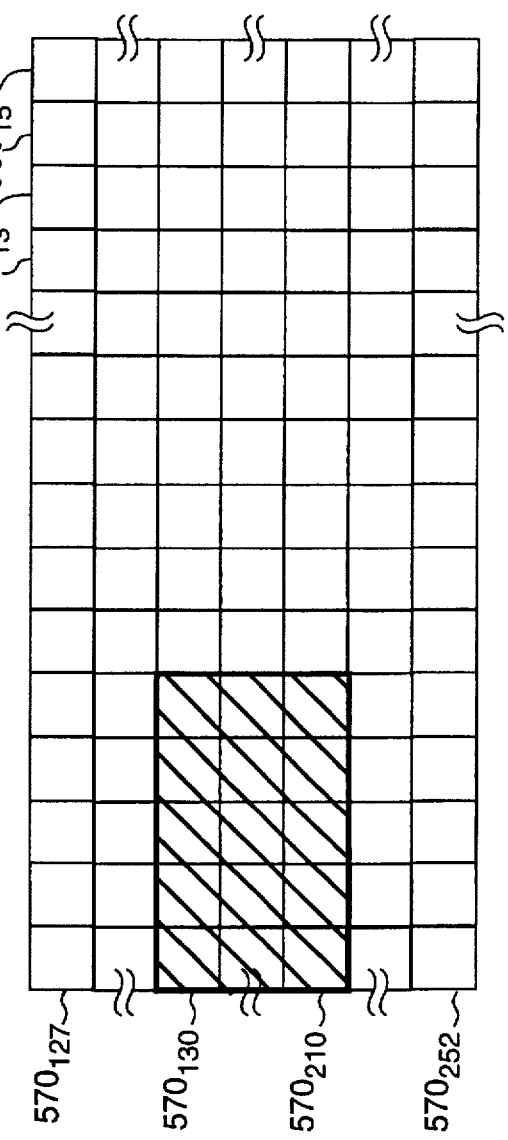
FIG. 4A
FIG. 4B

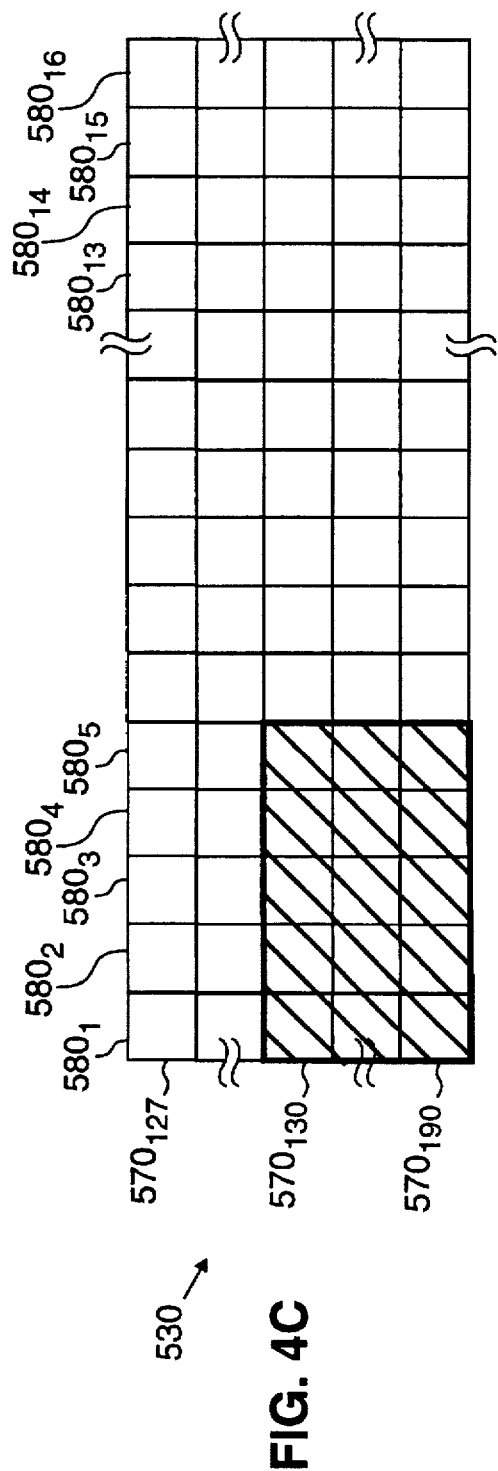
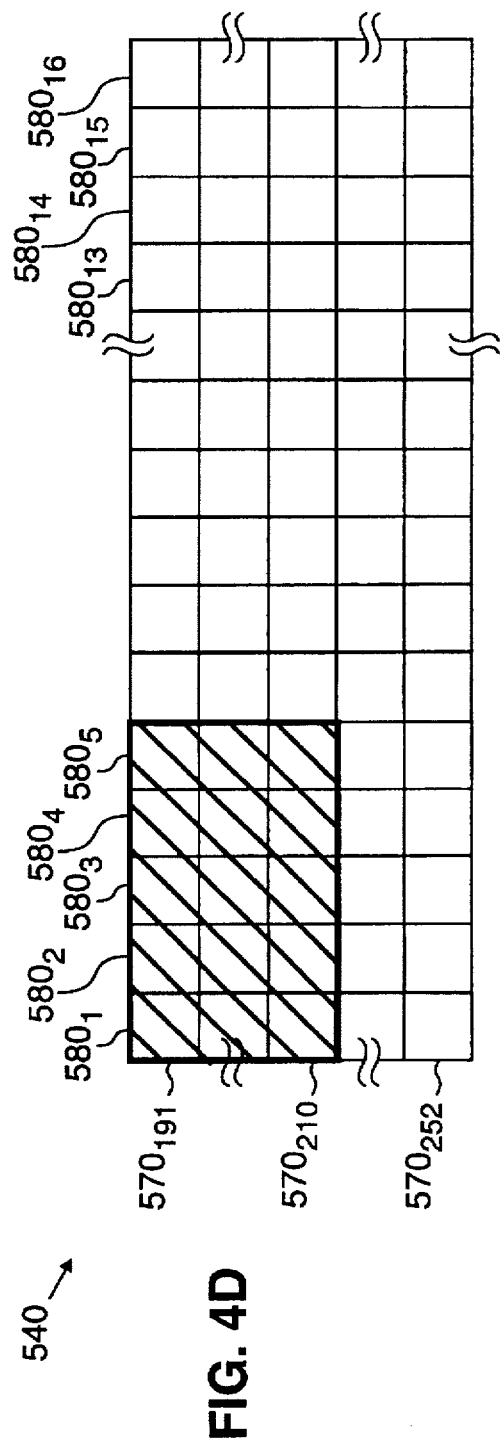

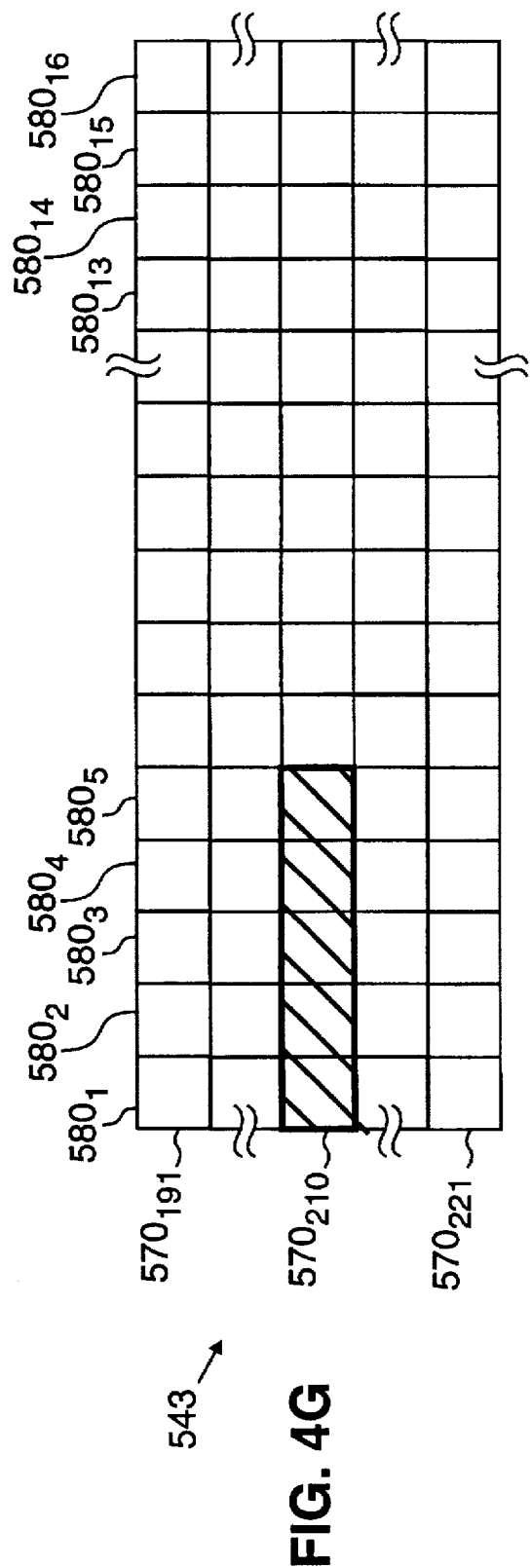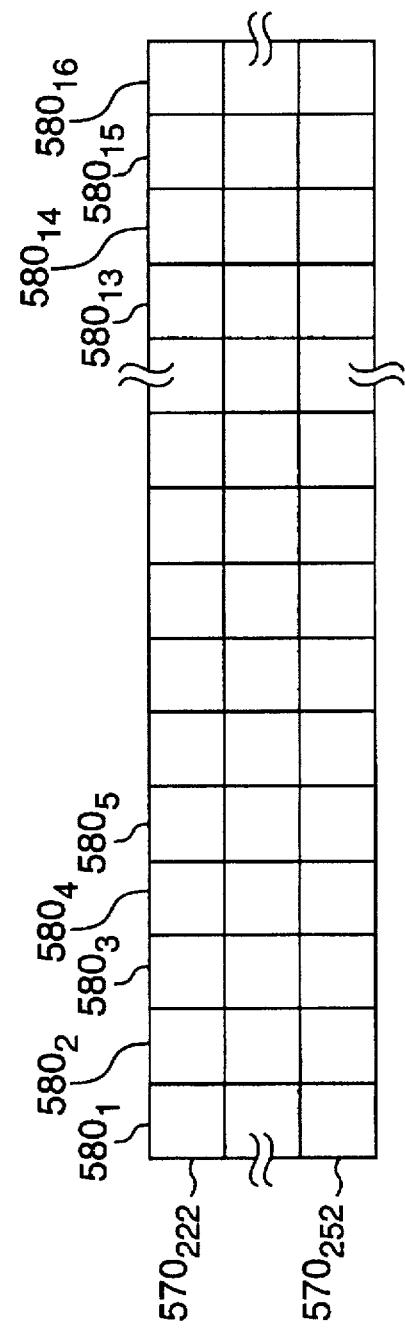
FIG. 4G
FIG. 4H

ADAPTIVE ARQ/FEC TECHNIQUE FOR MULTITONE TRANSMISSION

FIELD OF THE INVENTION

This invention relates generally to communication systems. More particularly, the present invention relates to the performance of iterative cyclic redundancy checking over frequency on a transmission block for detecting and correcting data transmission errors that may occur during multitone transmission.

BACKGROUND OF THE INVENTION

Communication in a digital communication system, such as a digital mobile cellular system, a digital cordless telephone system or a personal communication system, is achieved by transmitting information bits and parity checking bits on a modulated frequency carrier or a plurality of frequency carriers. Multitone transmission is a popular and widely used data communication technique which involves the transmission of blocks of information which, individually, comprise a plurality of words of information and parity checking bits that are transmitted at a plurality of frequencies. This transmission technique is described in L. J. Cimini, Jr., "Analysis and Simulation of a Digital Mobile Channel Using Orthogonal Frequency Division Multiplexing," IEEE Transactions on Communications, Vol. COM-33, pp. 665–675, July 1985, which is incorporated by reference herein.

Multipath fading is a source of transmission errors in a multitone transmission system. In a dense urban environment having many radio frequency transmitting sources and many reflective obstructions, transmission errors occur at a large number of frequencies for sustained periods of time as a result of multipath fading. Cyclic redundancy checking (CRC) over time and frequency are well known techniques utilized for detecting the presence of the transmission errors caused by multipath fading.

There exists a need for an efficient method for correcting these multipath fading errors. The well known technique of forward error control (FEC) provides for the correction of detected transmission errors based upon the number of parity bits transmitted in a transmission block. The number of parity bits typically transmitted in a transmission block for correcting transmission errors by FEC, however, is insufficient for correcting multipath fading errors. The application of FEC to correct all the multipath fading errors would require too many parity bits to be transmitted for each transmission block.

Another known error correction technique, automatic repeat request (ARQ), involves the retransmission of an entire word within which a transmission error is detected. ARQ, likewise, does not provide for the efficient correction of multipath fading errors in a multitone transmission system. All words in a multitone transmission block must be retransmitted by ARQ for correcting the multipath fading errors that are detected by CRC over frequency and time, even if only a small number of transmission errors are present in only some of the words of the transmission block. The continued retransmission of entire blocks of words, and the requirement that the transmitter and the receiver must also exchange acknowledgement and handshaking messages during these retransmissions, may unacceptably delay the transmission of information bits in a communication system.

SUMMARY OF THE INVENTION

In accordance with the present invention, CRC over frequency is iteratively performed on the words of a transmission block, using a select number of iteratively retransmitted parity bits, to maximize the ram at which information bits are correctly transmitted in a multitone transmission system experiencing multipath fading errors. The iterative retransmission of parity bits increases the probability that the detected transmission errors of a transmission block are correctable by FEC, and minimizes the need for retransmissions of entire blocks of information bits.

In one embodiment, a transmitter provides to a receiver a transmission block comprising a plurality of words comprised of information and/or parity checking bits which are simultaneously transmitted over a plurality of frequency channels. A processor in the receiver performs CRC over time on the words comprised of information bits in the transmission block to detect the presence of transmission errors. If any transmission error is detected, the processor performs CRC over frequency on these same words of the transmission block to detect any frequency channel at which a transmission error occurs.

If the processor determines that the number of parity bits transmitted in the transmission block does not enable the processor to obtain sufficient data for correcting by FEC the words in the transmission block for which transmission errors are detected, the processor iteratively requests that the transmitter retransmit additional parity bits to the receiver. The processor uses these additional parity bits to perform CRC over frequency on subsets of the set of words comprising the transmission block. The processor, if possible, then performs FEC on the individual words of these subsets, depending upon the data obtained from the performance of CRC over frequency on these subsets.

The retransmission of additional parity bits is performed for only a predetermined number of iterations for a particular transmission block. The processor requests that the transmitter retransmit all words in any subset of a particular transmission block which cannot be corrected by FEC, when the iteration limit is reached for that transmission block.

The processor maintains a continuous record of the frequency channels at which transmission errors are occurring, and transmits data representative of this information to the transmitter to prevent the transmission of data bits at frequency channels likely to experience transmission errors. In another embodiment, the number of parity bits transmitted per transmission block for performing CRC over time and FEC is adaptively changed in response to the changes that occur in the communication environment over time.

In still another embodiment, the processor attempts to perform FEC on each word of a transmission block before the processor determines whether the iterative performance of CRC over frequency on the transmission block is necessary.

Other features and advantages of the present invention will be readily apparent to those of ordinary skill in the art from the drawings and derailed description that follows.

DESCRIPTION OF THE DRAWINGS

FIG. 4A is a first error subblock of the multitone transmission block shown in FIG. 4.

FIG. 4B is second error subblock of the multitone transmission block shown in FIG. 4.

FIG. 4C is a first subdivision of the second error subblock shown in FIG. 4B.

FIG. 4D is a second subdivision of the second error subblock shown in FIG. 4B.

FIG. 4G is a further subdivision of the second subdivision of the second error subblock shown in FIG. 4D.

FIG. 4H is a further subdivision of the second subdivision of the second error subblock shown in FIG. 4D.

DETAILED DESCRIPTION

Figure 1:
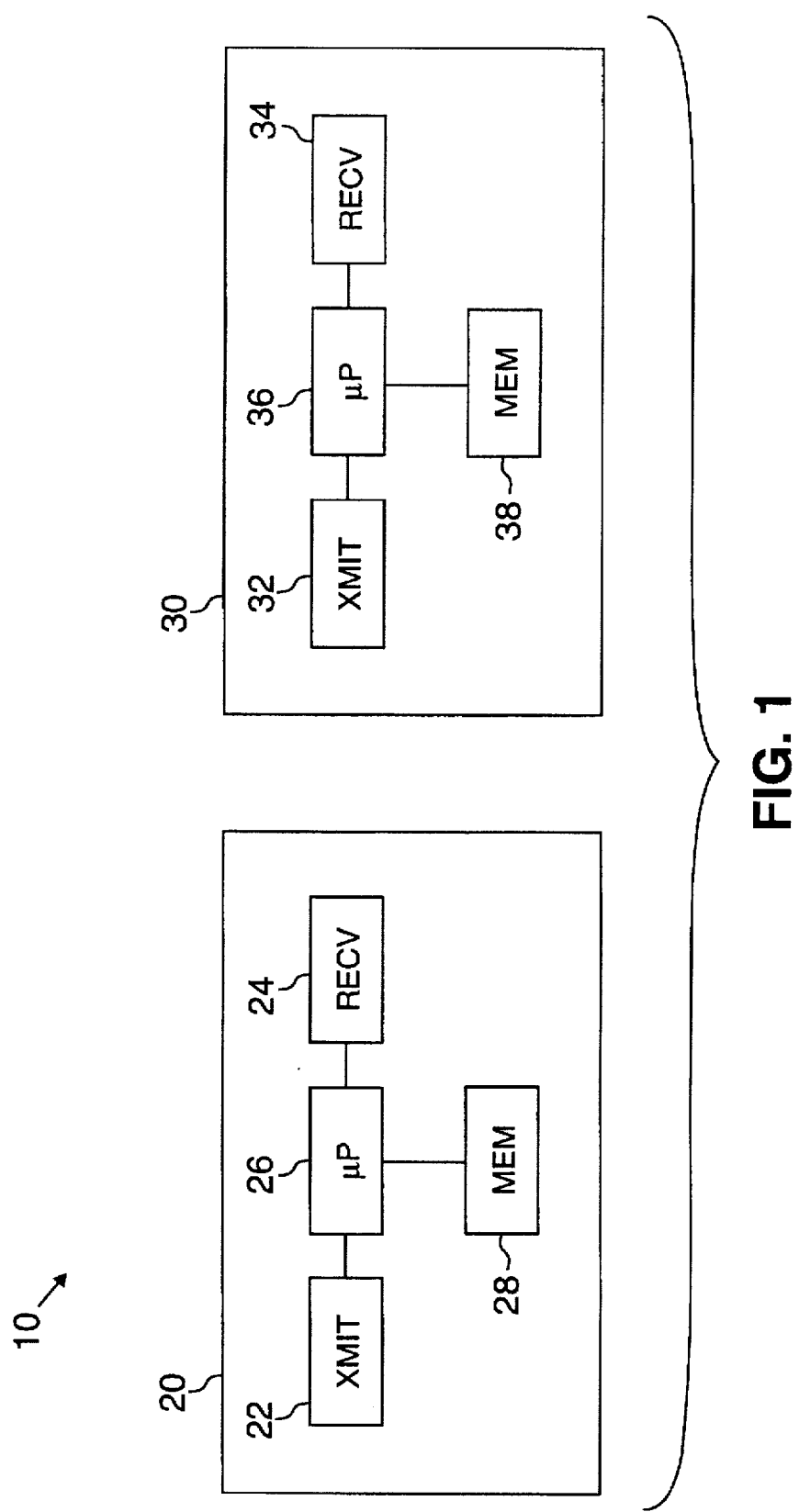
FIG. 1 illustrates a multitone communication system in which the error correction and data transmission methods of the present invention may be utilized.

FIG. 1 shows a multitone communication system 10. By way of example, the system 10 is a wireless communication system that is comprised of a transceiver 20, such as a telephone transmitter or a base station for a cordless phone, and a transceiver 30, such as a cordless telephone or a mobile cellular telephone. It is to be understood, however, that the system 10 may suitably comprise any data communication system where data information is transmitted between the transceiver 20 and the transceiver 30 and vice versa utilizing a multitone or multiple frequency transmission technique. The transceiver 20 and the transceiver 30 may be suitably connected to each other, for example, by a coaxial cable, a twisted pair cable or an optical connection.

The transceiver 20 comprises a transmitter 22, a receiver 24, a processor 26 and a memory 28. The processor 26 is connected to the transmitter 22, the receiver 24 and the memory 28. The transceiver 30, similarly, comprises a transmitter 32, a receiver 34, a processor 36 and a memory 38. The processor 36 is connected to the transmitter 32, the receiver 34 and the memory 38.

The transmitter 22 and the transmitter 32 may suitably comprise any conventional component that is a source of a plurality of frequency carriers which, respectively, are modulated with data bits. The receiver 24 and the receiver 34 may suitably comprise any conventional component that detects and receives data bits modulated on a plurality of frequency carriers.

The processor 26 and the processor 36 may suitably comprise any conventional microprocessor, such as a digital signal processor. The memory 28 and the memory 38 may suitably comprise a memory device, such as a RAM.

For purposes of the description of this invention, the processing by the processor 36 of the data bits transmitted from the transceiver 20 to the transceiver 30 is explained in detail below. It is to be understood, however, that data bits may be transmitted from the transceiver 30 to the stationary transceiver 20 and processed by the processor 24 in a similar fashion according to the present invention.

Figure 2:
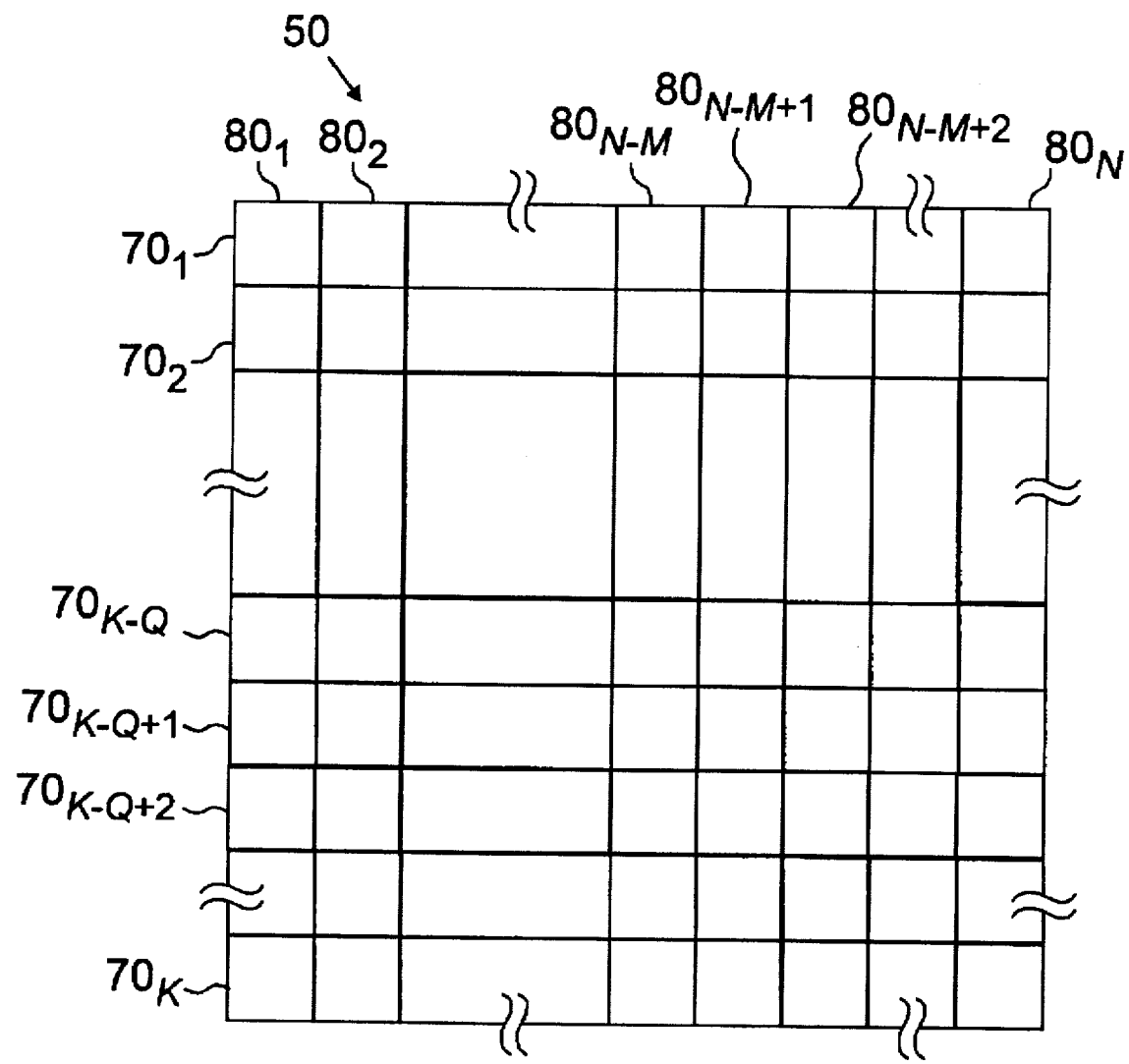
FIG. 2 illustrates a multitone transmission block for use in the system in FIG. 1.

FIG. 2 illustrates a multitone transmission block 50 that may be transmitted within the system 10 of FIG. 1 in the following manner. The receiver 34 of the transceiver 30 detects the transmission of the block 50 and provides the data bits contained within the block 50 to the processor 36. The processor 36 maps the data bits transmitted at the plurality of frequency carriers into a respective plurality of symbols called channel symbols, and stores the channel symbols in the memory 38 in the form of a plurality of words, where each word in the block is comprised of a plurality of channel symbols. For ease of reference, the channel symbol that is comprised of the map of the data bits transmitted at a specific frequency channel is referred to as the channel symbol at that specific frequency channel. The number of channel symbols in each word is equal to the number of frequency channels at which data bits are transmitted for the multitone transmission block. A transmission error that is experienced at a particular frequency channel during the transmission of a word of data bits is referred to as a channel symbol in error or a channel symbol in error at a particular frequency channel.

For ease of reference, the reception and transmission of data bits by the components of the transceiver 30 is described only in relation to the operations performed by the processor 36.

The block 50 is suitably comprised of a plurality of consecutively received words $70_1, 70_2, \ldots 70_K$ or $70_{1,2\ldots K}$, where K is preferably equal to 256. The words $70_{1,2\ldots K}$ are arranged as rows in the block 50, from top to bottom, suitably in the order that they are received by the transceiver 30. Each of the words $70_{1,2\ldots K}$ is comprised of a plurality of N channel symbols that are at the plurality of frequency channels $80_1, 80_2, \ldots 80_N$ or $80_{1,2\ldots N}$ at which the data bits are transmitted by the transceiver 20, where N is, preferably, either equal to sixteen or thirty-two.

Two types of parity checking bits are transmitted within the block 50 for detecting and correcting transmission errors that may occur during multitone transmission according to the present invention. Vertical parity checking bits are transmitted in vertical parity words which suitably comprise the consecutively numbered words $70_{K-Q+1}, 70_{K-Q+2}, \ldots 70_K$ in the block 50, where Q is preferably, equal to four or eight. The channel symbols in the Q vertical parity words, known as vertical parity symbols, are comprised exclusively of mapped vertical parity bits. The Q vertical parity symbols in each frequency channel of the block 50 comprise p vertical parity bits, where p is, preferably, equal to sixteen or thirty-two.

The channel symbols in words $70_1$ through $70_{K-Q}$ of the block 50 are comprised of information and horizontal parity checking bits. The horizontal parity bits are mapped into channel symbols called horizontal parity symbols. The frequency channels in the block 50 that are comprised of horizontal parity symbols are the frequency channels consecutively numbered $80_{N-M+1}, 80_{N-M+2}, \ldots 80_N$, where M is, preferably, equal to four or eight. The horizontal parity symbols at these frequency channels, starting from the frequency channel $80_{N-M+1}$, are suitably arranged consecutively from left to right in the words $70_1$ through $70_{K-Q}$.

The information bits in the words $70_1$ through $70_{K-Q}$ are mapped into channel symbols called information symbols.

The information symbols at the frequency channels $80_1$ through $80_{N-M}$ are arranged consecutively as columns in the words $70_1$ through $70_{K-Q}$, suitably from left to right, starting at the frequency channel $80_1$. It is to be understood that the words in a transmission block and the channel symbols within these words may be arranged in any suitable manner that permits the processing of the channel symbols in the transmission block according to the present invention.

Figure 3A:
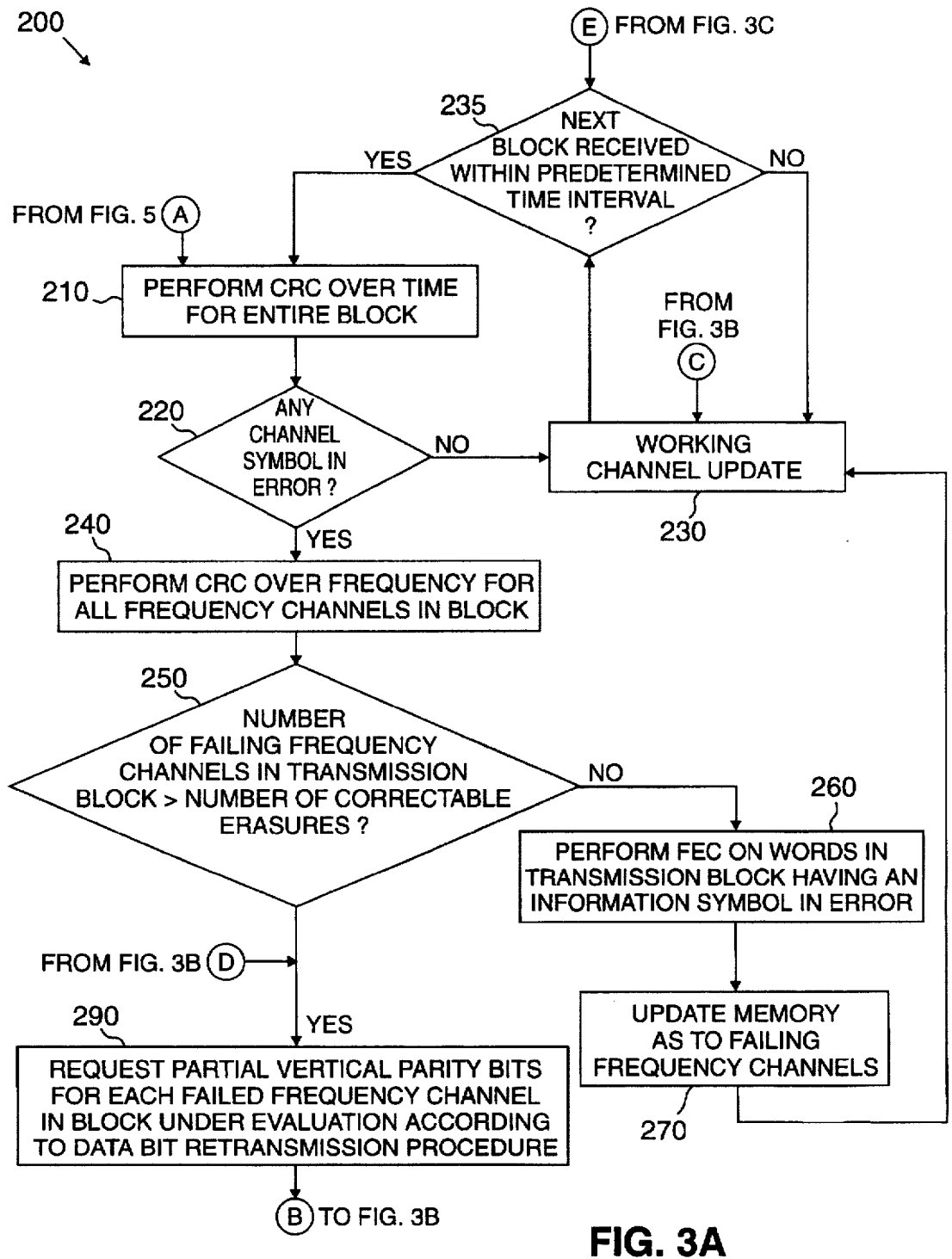
FIG. 3A and FIG. 3B are a flow diagram illustrating the error correction and data transmission methods according to the present invention.
Figure 3B:
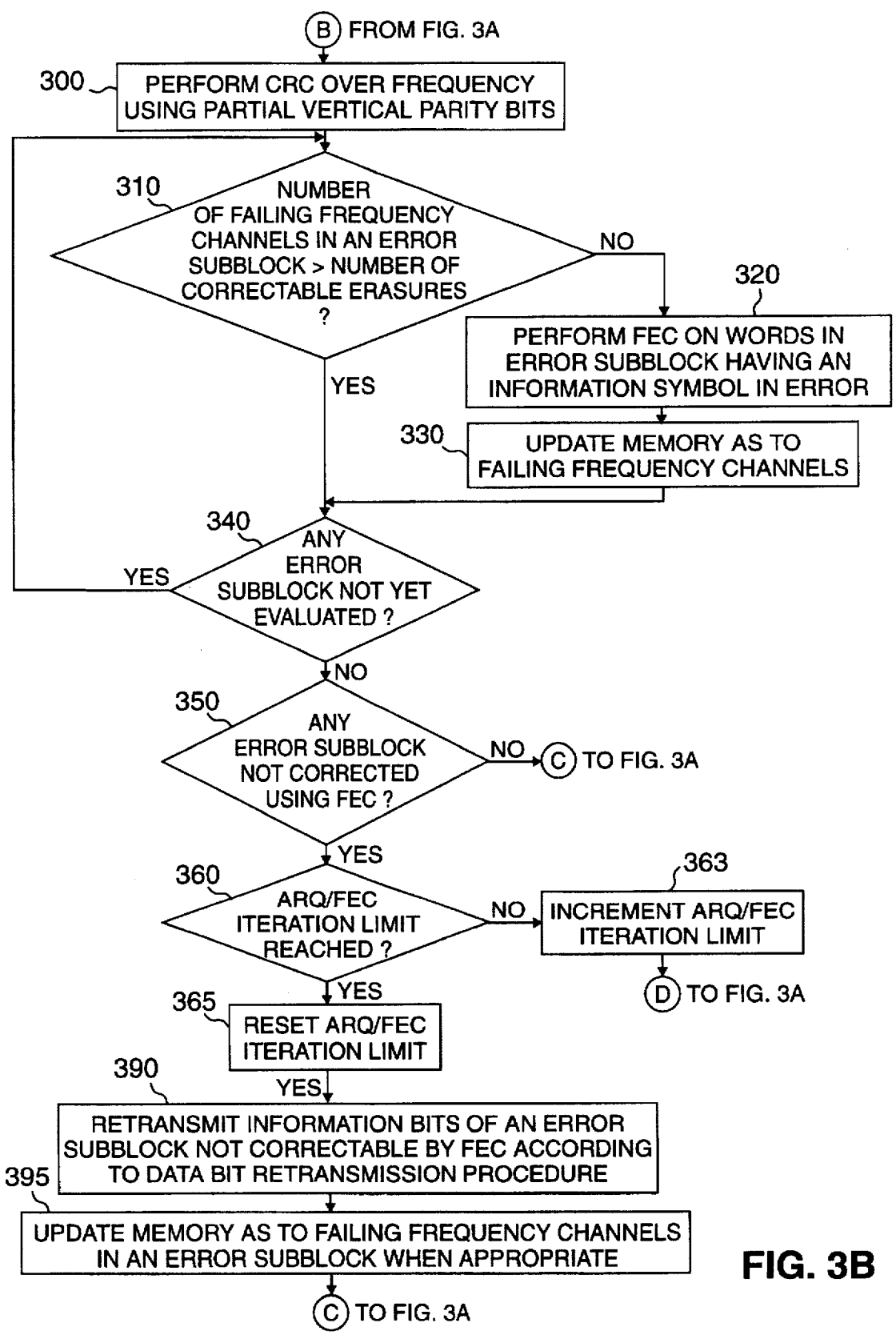

An adaptive automatic request/forward error control (ARQ/FEC) technique is explained with reference to the process 200 shown in FIGS. 3A and 3B. In short, the process 200 causes the retransmission of additional parity checking bits for correcting transmission errors in a transmission block, if the transmission errors detected in a transmission block are not correctable by FEC using the originally transmitted parity bits. The correction of a greater number of transmission errors, using the retransmitted parity bits, decreases or possibly eliminates the necessity that large numbers of information bits be retransmitted by ARQ because the detected transmission errors could not be corrected by FEC using only the originally transmitted parity bits.

In step 210, the processor 36 performs CRC over time on each word of a transmission block that is comprised of information symbols. CRC over time is performed, utilizing the respective horizontal parity symbols of these words, to detect whether any information symbol in the transmission block is mapped with information bits that are received in error at the transceiver 30. The processor 36 records in the memory 38 data concerning whether any information symbol is in error in the transmission block, and data concerning which words, if any, of the transmission block contain an information symbol in error.

Then in step 220, the processor 36 determines from the memory 38 whether any information symbol in the transmission block is in error. The processor 36 performs step 240 if the data in memory 38 indicates that at least one information symbol is detected in error for the transmission block. If the data in memory 38 indicates that no errors are detected in step 210, the processor 36 proceeds to perform step 230.

Figure 3C:
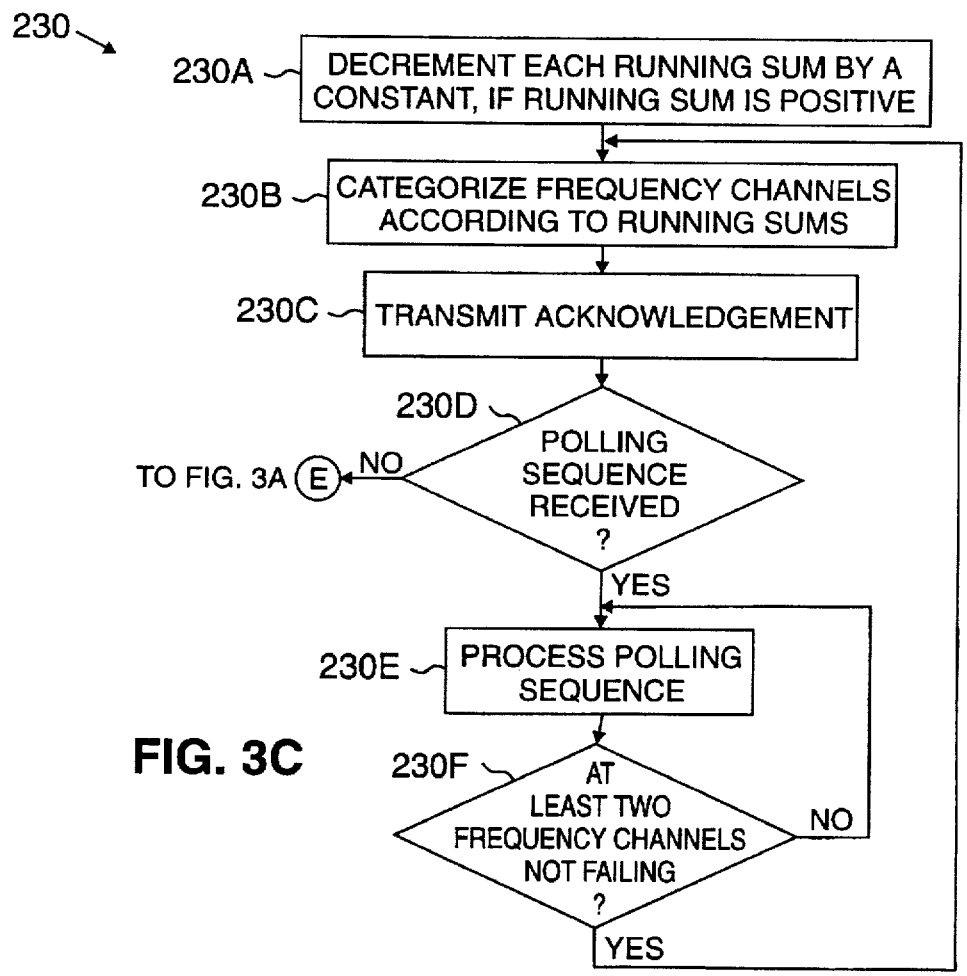
FIG. 3C is a flow diagram illustrating a method for determining which frequency channels should be designated as working for the transmission of a transmission block.

Step 230 is comprised of substeps 230A through 230F, as shown in FIG. 3C. As explained below, a continuous record of the transmission errors that are detected in any of the plurality of frequency channels during the course of processing transmission blocks in the process 200 is stored in the memory 38 by the processor 36 as a plurality of respective running sums. The processor 36 in step 230 uses the data represented by the plurality of running sums to determine which of the frequency channels, called working channels, are presently not experiencing transmission errors and therefore are useful for transmitting data bits. The processor 36 indicates the results of its determination to the transceiver 20 as part of step 230. In other words, the processor 36 determines from the memory 38 which, if any, of the frequency channels is currently experiencing multipath fading errors, and indicates to the transceiver 20 which frequency channels should no longer be used for data bit transmission.

The transceiver 30, therefore, uses the data represented in the running sums to control the frequency channels at which the transceiver 20 transmits information bits and parity checking bits to the transceiver 30. The working frequency channels in step 230 are updated after a transmission block is completely processed, in other words, is received error free or is correctable by FEC, according to this invention.

The processor 36 operates in the following manner to perform the above described functions associated with step 230. In substep 230A, the processor 36 decrements each running sum in the memory 36 by a predetermined decrementing parameter, D, as long as a particular running sum is positive. The decrementing parameter D is suitably set equal to a value which accounts for the passage of time during the processing of a transmission block. Alternatively, the decrementing parameter D may be utilized for decrementing the plurality running sums only at a first predetermined time interval as set by the user.

As explained below in greater detail with reference to steps 270, 330 and 395 of the process 200, the running sum for a particular frequency channel is incremented accordingly when a transmission error is detected at that frequency channel. In this invention, the values of the running sums are preferably always non-negative. The frequency channels with the lowest running sums are those having the lowest likelihood of experiencing transmission errors. The decrementing of the running sums in step 230A provides that the running sums represent a current record of the transmission errors which are detected during the course of processing transmission blocks.

In substep 230B, the processor 36 suitably categorizes all the N frequency channels that are used for data bit transmission in a transmission block according to their respective running sums. The processor 36 determines whether any of the plurality of the running sums in the memory 38 is equal to or greater than a first threshold value $T_1$ which may be set by the user. If the running sum is equal to or greater than $T_1$, then the frequency channel is designated as not useful for the transmission of data bits because of the high likelihood that transmission errors will occur. The processor 36 accordingly stores the outcome of this determination as data in the memory 38.

The processor 36 then determines whether any of the plurality of running sums in the memory 38 is equal to a value less than a second threshold value $T_2$ which may be set by the user. If the running sum is less than $T_2$, the respective frequency channel is designated a working frequency channel because there is a low likelihood that transmission errors will occur at that frequency channel. The processor 36 accordingly stores the outcome of this determination as data in the memory 38.

The number of working frequency channels which may be designated for transmitting information bits and horizontal parity bits, and the number of frequency channels that may be designated as not working or shut-off channels, for which data bits am not indicated for transmission, is defined in terms of the data stored in the memory 38 concerning the values of the running sums with respect to the first and second threshold values. The number of working frequency channels is used for determining which, if any, of the frequency channels should be allocated for the transmission of horizontal parity bits. As explained below, the number of frequency channels allocated for the transmission of horizontal parity bits affects the performance of FEC and CRC over time on the words of transmitted data bits.

By way of example, a ratio H/(H+I) may be used for determining which of the working frequency channels are allocated to the transmission of horizontal parity bits for the transmission of a transmission block, or the re-transmission of bits for correcting a transmission block as a retransmission block, as explained in further detail below concerning steps 290 and 390. It is to be understood, however, that other suitable relationships may be used to allocate some of the working frequency channels to the transmission of horizontal parity bits.

In this example, I is equal to the number of frequency channels, $FC_I$, that are to be allocated to the transmission of information bits. H is equal to the number of frequency channels, $FC_H$, that are to be allocated to the transmission of horizontal parity bits. The selected $FC_I$ and $FC_H$ are those working frequency channels having the best running sums, in other words, the lowest running sums.

The processor 36 is programmed to perform an algorithm in substep 230B that results in the calculation of the values of H and I. First, the processor 36 would attempt to set the ratio H/(H+I) as close as possible to r, where r is a function of the running sums of each of the frequency channels. For example, r may be set equal to the sum of the running sums of the non-failing frequency channels, S, divided by the product of the number of frequency channels which were used for the transmission of information bits in the previous data transmission, $\Gamma$, and $T_2$, or $r=S/(\Gamma^*T_2)$. Therefore, in the circumstance where I+H is equal to two, I would be equal to one for all values of r. Further, if I+H is greater than two, I is determined by solving the inequality $$\frac{I}{I+H-1} \geq (1-r) > \frac{I-1}{I+H-1}.$$

the calculted value of I.

After H and I are determined, the processor 36 would assign the appropriate number of working frequency channels for the transmission of information and horizontal parity checking bits, and accordingly store data in the memory 38 representative of this assignment. All working frequency channels, of course, are used for the transmission of vertical parity bits.

In this example, the working frequency channels are allocated to the transmission of information bits and horizontal parity bits. It is noted that working frequency channels, other than those allocated to horizontal parity bit transmission, may be used for retransmitting additional parity checking bits or information bits, as explained below. Therefore, in steps 290 and 390, as explained below, I is equal to the number of frequency channels that are to be allocated for the retransmission of parity or information bits.

Based on the above determination, the processor 36 in substep 230C transmits an acknowledgement to the transceiver 20. The acknowledgement indicates those frequency channels, if any, that are allocated for the transmission of information bits and horizontal parity bits. The transceiver 20, in response to the acknowledgement, transmits data bits at the appropriately indicated working frequency channels. In other words, the transceiver 20 uses the information transmitted in the acknowledgement to control the frequency channels at which it continues to transmit data bits until a new acknowledgement concerning working frequency channels is received.

The acknowledgement is ordinarily transmitted after the processing of every transmission block, after the processing of multiple transmission blocks, or at predetermined intervals set by the user. If the transceiver 20 does not receive this acknowledgement within a second predetermined interval, as set by the user, the transceiver 20 begins to transmit periodically sequences of polling signals on all frequency channels to the transceiver 30. In the case where the acknowledgement indicates that there was only one working frequency channel, the transceiver 20 transmits polling sequences on all shut-off channels.

In substep 230D, the processor 36 determines whether the transceiver 20 is transmitting polling sequences. If no polling sequences are detected within a third predetermined interval, as set by the user, after the transceiver 30 transmits the acknowledgement, the processor 36 proceeds to step 235. In this circumstance, the transceiver 20 has received an acknowledgement indicating that at least two frequency channels are working frequency channels that may be used for data bit transmission.

If polling sequences are detected in substep 230D, the processor 36 in substep 230E begins processing the polling sequence using well known techniques. If in substep 230F the processor 36 determines from the results of the processing of the polling sequence that at least two frequency channels are working, the processor 36 reestablishes the communication link with the transceiver 20 using well-known handshaking methods. In addition, the processor 36 resets the running sums for the working frequency channels to zero and the running sums for other frequency channels to a value that is higher than the second threshold value. The processor 36 then proceeds to perform step 235 after performing substeps 230B, 230C and 230D as described above.

On the other hand, if the processor 36 determines in substep 230F from the results of the processing of the polling sequences determined in substep 230E that there are less than two frequency channels working, it then proceeds to substep 230E and continues to process the polling sequences that are being transmitted. The processor 36, thus, continues to perform substeps 230E and 230F until at least two frequency channels are determined to be working.

In step 235, the processor 36 attempts to retrieve the next transmission block of channel symbols that is received and stored in the memory 38. The data bits for this next transmission block are transmitted according to the determination of working and shut-off frequency channels in step 230. If any such transmission block is stored in memory 38 within a fourth predetermined interval, the processor 36 starts to process it from step 210. The fourth predetermined interval is also suitably set by the user.

In the event a transmission block is not stored in the memory 38 within the fourth interval, the processor 36 then performs step 230. The steps 230 and 235 are repeatedly performed by the processor 36 until a transmission block is received and stored at the transceiver 30.

In step 240, the processor 36 performs CRC over frequency on the channel symbols in the transmission block to identify any frequency channel in the transmission block that has a transmission error. As is well known in the art, CRC over frequency is performed on the channel symbols at a specific frequency channel in a block of words by using the vertical parity bits which are mapped into the vertical parity symbols at that specific frequency channel. The processor 36 accordingly records in the memory 38 data concerning any frequency channel in the transmission block which is detected as having an information symbol or a horizontal parity symbol in error.

After performing step 240, the processor 36 in step 250 then determines whether the total number of frequency channels detected in error in the transmission block exceeds the largest number of frequency channels, which have a transmission error in the transmission block, that is correctable by FEC using the horizontal parity symbols transmitted for the words of the transmission block. For ease of reference, the number of correctable erasures for a block of words, such as a transmission block, defines the largest number of frequency channels in the block, which are detected as having a transmission error by the performance of the CRC over time and frequency, that are correctable by FEC. Further, a frequency channel in the block at which a transmission error is detected is called a failing frequency channel.

The number of correctable erasures for any word in a block of words depends on the particular parity code used for transmitting the horizontal parity bits for that block. At most, for the words of a transmission block, the number of correctable erasures is equal to the number of horizontal parity symbols or the number of frequency channels allocated to horizontal parity bit transmission. Therefore, the fewer number of horizontal parity symbols available for performing FEC, the fewer number of information symbols in error that are correctable by FEC.

If the number of failing frequency channels in the transmission block does not exceed the number of correctable erasures, the processor 36 in step 260 uses the data stored in the memory 38, obtained from the performance of CRC over time and frequency on the transmission block, to perform FEC on each word in the transmission block that the processor 36 detected as having an information symbol in error. FEC is performed in step 260 to correct all information symbols in error in the transmission block, because the data stored in the memory 38 is sufficient for the processor 36 to identify specifically any channel symbol in error in the transmission block.

After FEC is performed in step 260, the processor 36 then performs 270. In step 270, for each information symbol at a particular frequency channel that is corrected by FEC in step 260, the processor 36, by a value of one, increments the running sum value in the memory 38 that corresponds to that particular frequency channel. Also, for each horizontal parity symbol at any frequency channel that may be identified as in error, the running sum value in the memory 38 that corresponds to that particular frequency channel is incremented by a value of one. In other words, the processor 36 updates the running sums in the memory 38 as to the errors that are occurring at the particular frequency channels. It is to be understood, however, that the running sums may be incremented by other suitable values that provide for maintaining a continuous record of transmission errors. The processor 36 then perform step 230.

On the other hand, if the processor 36 determines in step 250 that the number of failing frequency channels in the transmission block exceeds the number of correctable erasures, the processor 36 then performs step 290. In this case, the data in the memory 38 obtained from the performance of CRC over time and frequency on the transmission block does not allow for the identification of which frequency channels contain information symbols in error in the words of the transmission block that were detected as having transmission errors. This inability occurs because the number of failing frequency channels in the transmission block exceeds the number of correctable erasures.

At this point, several terms and concepts are defined to provide a background for an understanding of steps 290 and 300 of the process 200. A block under evaluation is defined as that block of words that is formed from some or all of the words that comprise the transmission block for which additional vertical parity bits, called partial vertical parity bits, are requested for retransmission in step 290. The partial vertical parity bits requested for a particular block under evaluation are those that enable the processor 36 in step 300 to subdivide that block under evaluation into blocks called error subblocks. An error subblock is comprised of a subset of the plurality of words that comprise the particular block under evaluation. The specific partial vertical parity bits that are requested for retransmission enable the processor 36 to determine, by performing CRC over frequency on the block under evaluation using these partial vertical parity bits, whether those frequency channels of the block under evaluation, which were detected as having an information symbol error, also have an information symbol in error in an error subblock subdivided from the block under evaluation. In other words, CRC over frequency is performed on the error subblocks defined from the block under evaluation at the frequency channels of the block under evaluation that were allocated to the transmission of information bits and were determined to have transmission errors.

An ARQ/FEC iteration commences each time the processor 36 performs step 290 on the words of a specific transmission block. The processor 36 always performs the first ARQ/FEC iteration on the transmission block itself, such that the transmission block is the first block under evaluation. As explained in detail below, step 290 may be performed a number of times for a specific transmission block. The processor 36 stores in the memory 38 data representative of the number of ARQ/FEC iterations performed for a specific transmission block. The memory 38 is updated and incremented accordingly by the processor 36 each time that the processor 36 performs step 290 for a specific transmission block.

In step 290, for the first ARQ/FEC iteration, the processor 36 transmits a request to the transceiver 20 that the transceiver 20 retransmit partial vertical parity bits for performing CRC over frequency on the failing frequency channels of the transmission block. The transceiver 20 processes this request using conventional techniques, and then retransmits to the transceiver 30 partial vertical parity bits, respectively, for each failing frequency channel in the transmission block. The process steps performed to obtain the retransmission of data bits are explained in greater detail below.

Figure 3E:
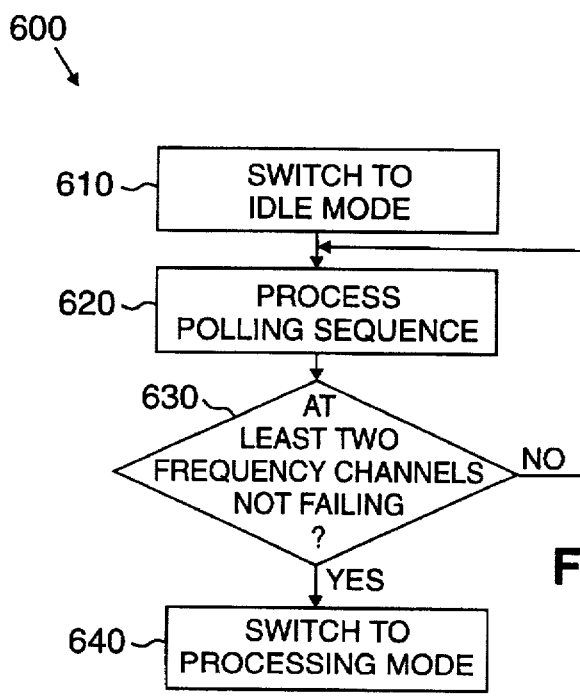
FIG. 3E is a flow diagram illustrating a method for determining when at least two frequency channels are available for data transmission.
Figure 3D:
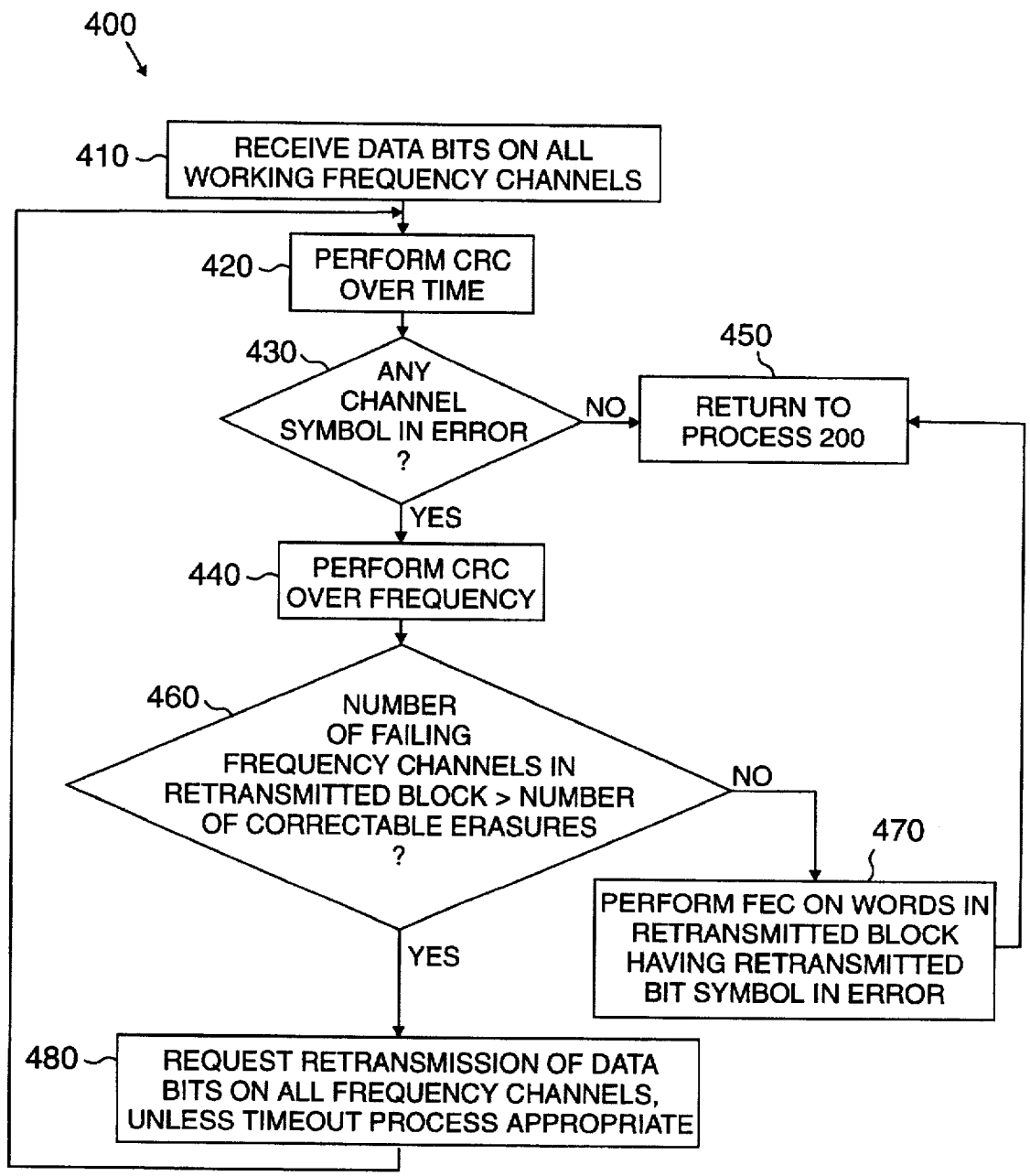
FIG. 3D is a flow diagram illustrating a method for checking that data bits requested for retransmission are correctly received, and for continuing to request retransmission until a correct transmission is achieved.

For the process 200, each time that the processor 36 requests that the transceiver 20 retransmit bits, either as partial vertical parity bits in step 290 or, as explained below, as the information bits in the words of an error subblock in step 390, the processor 36 must determine whether the retransmitted bits have been correctly transmitted. A correct retransmission is a retransmission that is error free or one for which any transmission error that is detected as occurring in the retransmitted bits during the retransmission is correctable by FEC using the horizontal parity bits that are transmitted along with the retransmitted bits. This retransmission and error checking procedure is shown in FIG. 3D as the process 400, and is necessarily performed as part of step 290 and step 390.

In step 410, the processor 36 transmits a request signal to the transceiver 20 requesting that specific bits be retransmitted to the transceiver 30, and indicating the working frequency channels upon which the transmission is to occur. The requested bits are mapped for retransmission on the working frequency channels using well known techniques, such that the requested bits are accordingly retransmitted as a retransmitted block of words comprised of retransmitted bits and horizontal and vertical parity bits. These words may be stored at the transceiver 30 as a matrix of rows of words in a retransmission block in the same manner as the words which are transmitted as a transmission block. The horizontal and vertical parity bits, which are mapped in the retransmission block as horizontal and vertical parity symbols by the processor 36, are used for detecting and then correcting by FEC the transmission errors that are detected in any channel symbol in the retransmitted block that is mapped with the retransmitted bits, called a retransmitted bit symbol, such as, for example, the partial vertical parity bits requested for retransmission in step 290. The processor 36 in step 420 then performs CRC over time on the words in the retransmitted block, and stores data concerning this result in the memory 38. In step 430, the processor 36 then determines whether any channel symbol in the retransmitted block is in error. If none is in error, the processor 36 in step 450 then proceeds to the step of the process 200 that follows the step of the process 200 at which the retransmission and checking process 400 was invoked.

On the other hand, if the processor 36 in step 430 determines that any channel symbol is in error in the retransmitted block, it then performs in step 440 CRC over frequency on the frequency channels in the retransmitted block. The processor 36 then stores data concerning this result in the memory 38.

After step 440, the processor 36 in step 460 determines whether the number of failing frequency channels in the retransmitted block exceeds the number of correctable erasures. In the case where the number of failing frequency channels in the retransmitted block does not exceed the number of correctable erasures, the processor 36 in step 470 performs FEC on the words of the retransmitted block having a retransmitted bit symbol in error. After step 470, the processor then performs step 450.

On the other hand, where the number of failing frequency channels in the retransmitted block exceeds the number of correctable erasures for the retransmitted block, the processor 36 then performs step 480. In step 480, the processor 36 transmits a request to the transceiver 20 that the transceiver 20 retransmit the requested bits on all available frequency channels. The processor 36 then performs step 420. In other words, steps 420 through 480 are performed until the retransmission block is correctly transmitted.

Alternatively, step 480 may involve continuous requests for transmission of the retransmission block, where the processor 36 requests that the transceiver 20 use a lower rate vertical parity code, such as ½, ⅓, ¼, etc., as is well known in the art, for subsequent requests for retransmissions in order to increase the likelihood that retransmitted bits are correctly retransmitted. The processor 36 may continue the transmission of the retransmitted bits as a retransmission block for only a predetermined number of times, after which, if a retransmission block is not correctly received, the processor 36 performs a time-out process 600, as shown in FIG. 3E. For purposes of describing this invention, the time-out process 600 is performed in step 480, if necessary, in the course of processing a transmission block using the process 200.

The process 600 may comprise any suitable method for determining when at least two frequency channels are working in a multitone transmission system. The circumstance that less than two frequency channels are available for the transmission of data bits commonly occurs as a result of multipath fading. The performance of process 600 effectively delays the retransmission of words of data bits in step 290, and in step 390, until at least two frequency channels can be declared as working.

The process 600 is comprised of steps 610 through 640. The processor 36 in step 610 switches to idle mode and transmits a time-out signal to the transceiver 20 that indicates that it has switched into idle mode. As explained above with reference to step 230, ordinarily, when there are at least two working frequency channels available, the transceiver 30 continually transmits acknowledgement signals to the transceiver 20 to indicate that processing of the transmitted data bits is proceeding. If the transceiver 20 receives the time-out or does not receive the time-out signal or an acknowledgement within a predetermined interval set by the user as a result of multipath interference errors, the transceiver 20 starts to transmit to the transceiver 30 a plurality of polling sequences as described above.

In step 620, the processor 36 processes any of the polling sequences that are received by the transceiver 30 in the same manner as in substep 230E of the step 230. If, in step 630, the processor 36 determines from the polling sequences that at least two frequency channels are working, the processor 36 performs step 640.

In step 640, the processor 36 switches out of idle mode, and transmits a time-out acknowledgement to the transceiver 20 that indicates the working frequency channels at which data bits may be retransmitted. The running sums for the frequency channels are then suitably updated to indicate which frequency channels are currently working and which are shut-off. The running sum for a working channel is preferably set to a value at the midpoint between $T_1$ and $T_2$, and the running sum for a shut-off channel is preferably set to a value greater than $T_2$.

After the time-out acknowledgment is transmitted, the processor 36 proceeds to step 480 of the process 400 and requests the retransmission of the bits at the respective working channels. For purposes of this description, the working frequency channels are allocated to the transmission of horizontal parity bits in the same manner as described above for step 230. It is to be understood, however, that other suitable methods for allocating working frequency channels to horizontal parity bit transmission also may be utilized.

On the other hand, if the processor 36 in step 630 determines that the results of processing on the polling sequences do not indicate that there are at least two working frequency channels, the processor 36 then performs step 620. The processor 36, therefore, continues to perform steps 620 and 630 until at least two frequency channels can be declared as working frequency channels. The performance of the process 400 relative to step 290 of the process 200, thus, continues until the point where the retransmission block is received correctly.

In step 300, the processor 36 utilizes the retransmitted partial vertical parity bits to subdivide the transmission block, as the block under evaluation in the first ARQ/FEC iteration, into vertical error subblocks. The transmission block is subdivided because the retransmitted partial vertical parity bits contain information that enables the processor 36 to perform CRC over frequency at specific frequency channels on subsets of the plurality of words that comprise the transmission block. Using well known techniques, the processor 36 stores data in the memory 38 concerning the performance of step 300 on the error subblocks defined from the block under evaluation.

The partial vertical parity bits requested for retransmission are, preferably, used to subdivide the block under evaluation into a first error subblock and a second error subblock. For the first ARQ/FEC iteration, the partial vertical parity bits retransmitted provide information for the subdivision of only that portion of the transmission block that comprises the words that include information symbols. As explained below, for subsequent ARQ/FEC iterations, the partial vertical parity bits requested for retransmission may be used for subdividing the block under evaluation in any suitable fashion because all of the words in these blocks under evaluation are comprised of information symbols.

The transceiver 30 sends the row and column indices of the block under evaluation to identify the groups of words that are to be subdivided from the block under evaluation. The transceiver 20 preferably transmits, for each failing frequency channel in the block under evaluation, a first and a second set of partial vertical parity bits for performing CRC over frequency on the block under evaluation. For example, in the first ARQ/FEC iteration, the first set of partial vertical parity bits retransmitted is used for performing CRC over frequency on a subset of the words in the transmission block that define the first error subblock. The first error subblock is suitably comprised of the consecutive rows of the transmission block, starting from the top row and continuing consecutively downward, row-by-row, up to and including the row that allows subdivision of the transmission block approximately in half with respect to the rows of words that are comprised of information symbols. The second set of partial vertical parity bits is retransmitted for each failing frequency channel in the transmission block for performing CRC over frequency on the remaining words in the transmission block, and defining the second error subblock in step 300. The second error subblock is suitably comprised of the consecutive rows of the transmission block, starting from the row subsequent to the bottom row in the first error subblock. Alternative methods for subdivision are also possible, such as, for example, subdivision of the block under evaluation into more than two vertical subblocks. After performing step 300, the processor 36 in step 310 determines, for any of the error subblocks defined in step 300, whether the number of frequency channels having a channel symbol in error exceeds the number of correctable erasures. If the number of failing frequency channels in the error subblock exceeds the number of correctable erasures, the processor 36 proceeds to step 340. If the number of failing frequency channels in the error subblock does not exceed the number of correctable erasures, the processor 36 then in step 320 performs FEC on the words in the error subblock that contain erroneous information symbols. Step 320 is performed by the processor 36 in a manner similar to that of step 260 as described above.

The performance of CRC over frequency on the smaller set of words in an error subblock is advantageous. The smaller number of words in the error subblock increases the likelihood that the number of frequency channels detected as having an information symbol in error, by the performance of CRC over frequency on the error subblock, does not exceed the number of correctable erasures. For instance, the data stored in memory 38 concerning the performance of CRC over time and frequency on the words that are contained in the error subblocks may allow for the identification of the frequency channels containing information symbols in error for particular words in the error subblock. These identified errors would not be greater than the number of correctable erasures for the words of the error subblock. Thus, the transmission errors in the error subblock would be correctable by FEC.

After the information symbols in error for the error subblock are corrected by FEC in step 320, the processor 36 in step 330 updates the memory 38 concerning the failing frequency channels. Step 330 is performed by the processor 36 in a manner similar to that of step 270 described above.

The processor 36, then, in step 340 determines whether any of the error subblocks defined in step 300 during the current ARQ/FEC iteration has not been evaluated pursuant to step 310. If such an error subblock exists, the processor 36 then performs step 310 along with step 320 and step 330, if possible, on that error subblock. For purposes of this invention, the order in which the processor 36 performs step 310 on the error subblocks defined in step 300 during an ARQ/FEC iteration is unimportant. When the processor 36 in step 340 determines that all error subblocks defined during the current ARQ/FEC iteration have been evaluated, the processor 36 then proceeds to perform step 350.

In step 350, the processor 36 determines whether any of the error subblocks defined in step 300 during the current ARQ/FEC iteration could not be corrected by FEC, in other words, whether at least one error subblock defined during the current ARQ/FEC iteration has more failing frequency channels than the number of correctable erasures. If all the error subblocks defined during the current ARQ/FEC iteration have undergone FEC, the processor 36 then performs step 230.

On the other hand, if the processor 36 determines that at least one error subblock defined in step 300 during the current ARQ/FEC iteration could not be corrected by FEC, the processor performs step 360. In step 360, the processor 36 determines whether the number of ARQ/FEC iterations performed at that point in the ARQ/FEC process 200 for a specific transmission block is equal to an iteration limit, L, which limits the number of ARQ/FEC iteration to be performed on a specific transmission block. The iteration limit L may suitably be pre-set in the memory 38 or changed by using a suitable handshaking operation between the transceiver 20 and the transceiver 30. The limit L is preferably set to a value that maximizes the efficiency of the ARQ/FEC technique with respect to the performance of ARQ on words of the transmission block that are not correctable by FEC, and is preferably equal to three for a transmission block approximately 256 words in length and having data transmitted over sixteen frequency channels. As a result, the retransmission of additional partial vertical parity bits for a specific transmission block is not requested where the performance of ARQ on a group of words of a transmission block is a more efficient method of obtaining a correct transmission of information bits.

When the processor 36 in step 360 determines that the number of ARQ/FEC iterations that have been performed is equal to the iteration limit, it then proceeds to step 365. In step 365, the processor 36 accordingly resets the data in the memory 38 that represents the number of ARQ/FEC iterations performed to provide for the performance of the ARQ/FEC process 200 on another transmission block, and then proceeds to step 390.

On the other hand, if the number of ARQ/FEC iterations is less than the iteration limit, the processor 36 in step 363 accordingly increments the ARQ/FEC iteration count in the memory 38 and then proceeds to step 290.

For instance, the second time that the processor 36 performs step 290 for a specific transmission block constitutes the performance of a second ARQ/FEC iteration. Any error subblock which was defined from the transmission block and could not be corrected by FEC in the first ARQ/FEC iteration becomes a block under evaluation for purposes of the performance of step 290. It is possible, for instance, that all of the error subblocks defined in the first ARQ/FEC iteration are blocks under evaluation in the second ARQ/FEC iteration. The processor 36 requests the retransmission of additional partial vertical parity bits for any block under evaluation defined for the performance of the second ARQ/FEC iteration. The partial vertical parity bits transmitted in step 290 in the second ARQ/FEC iteration are transmitted in the same manner and are of the same form as those transmitted in step 290 in the first ARQ/FEC iteration.

The processor 36 then performs CRC over frequency in step 300, using the respective retransmitted partial vertical parity bits, on any block under evaluation defined for the second ARQ/FEC iteration. Any such block under evaluation is further subdivided into error subblocks in the same manner as described above for the first ARQ/FEC iteration.

The error subblocks defined in the second ARQ/FEC iteration in step 300 are then evaluated in steps 310 through 350 in the same manner as those error subblocks defined in the first ARQ/FEC iteration. If any error subblock defined in the second ARQ/FEC iteration cannot be corrected by FEC, additional ARQ/FEC iterations are performed on these error subblocks in the same manner as that performed during the second ARQ/FEC iteration. The performance of ARQ/FEC iterations continues until the ARQ/FEC iteration limit is reached for a specific transmission block.

Thus, each time step 290 is performed after the completion of the fast ARQ/FEC iteration, additional partial vertical parity bits for the failing frequency channels of each error subblock not correctable by FEC in the previous ARQ/FEC iteration are requested for retransmission. These additional partial vertical parity bits are utilized for further subdividing the error subblocks not correctable by FEC in the previous iteration. This iterative process reduces the number of words upon which CRC over frequency is performed. Consequently, the likelihood increases that the number of failing frequency channels in an error subblock does not exceed the number of correctable erasures. Thus, a greater likelihood that FEC will be performed on the words having information symbols in error in a transmission block exists because there is sufficient data in the memory 38 for identifying the frequency channels containing these errors. The necessity of retransmissions of large numbers of information bits by ARQ, therefore, decreases.

After the ARQ/FEC iteration limit is reset in step 365 in the circumstance where some words of the transmission block still have not been corrected, the processor 36 in step 390 requests the transmitter to retransmit the information bits of the words in any error subblock that could not be corrected by FEC. The request for retransmission of information bits is performed according to the process 400 in the same manner as described above with respect to the retransmission of partial vertical parity bits in step 290.

After performing step 390, the processor 36 in step 395 updates the failing frequency channels for the retransmitted error subblocks, only if the processor 36 did not perform the time-out process 600 as part of step 390. The processor 36 increments the running sums for the frequency channels determined to have errors in the error subblocks by a value J for each error subblock for which ARQ retransmission occurred, where J is preferably equal to the vertical size of the error subblock, in other words, the number of words in the error subblock. The processor 36 then performs step 230.

Figure 4:
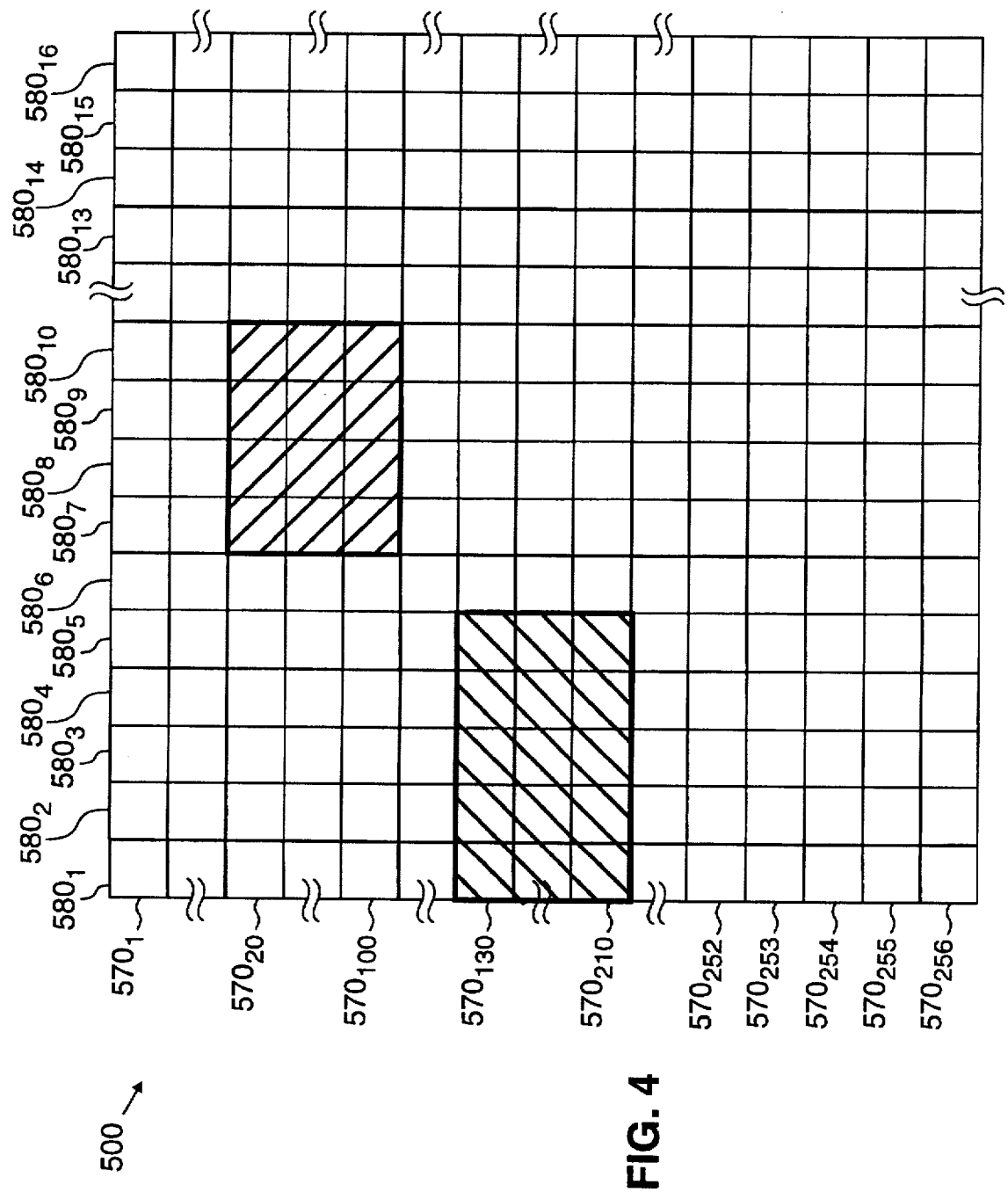
FIG. 4 is a multitone transmission block used for illustrating the methods of error correction and data transmission according to this invention.

By way of example, the adaptive ARQ/FEC process 200 is performed on a transmission block 500, shown in FIG. 4, as transmitted in the system 10, to highlight the advantages of this invention.

The block 500 is comprised of words $570_1$ through $570_{252}$, which are received consecutively at the transceiver 30. The words $570_1$ through $570_{252}$ are arranged as rows, from top to bottom, starting from the word $570_1$, to correspond to the order that words would be received at the transceiver 30. The words $570_1$ through $570_{252}$ are comprised of information bits and horizontal parity bits.

Frequency channels $580_1$ through $580_{16}$ comprise the frequency channels at which the data bits are transmitted in the block 500. These frequency channels are arranged consecutively as columns in the words of the block 500, from left to right, starting from the frequency channel $580_1$. For the words $570_1$ through $570_{252}$, the frequency channels $580_{13}$ through $580_{16}$ are comprised of horizontal parity symbols mapped with horizontal parity bits, and frequency channels $580_1$ through $580_{12}$ are comprised of information symbols mapped with information bits.

The block 500 further comprises vertical parity words $570_{253}$ through $570_{256}$. These vertical parity words are comprised exclusively of vertical parity symbols at the frequency channels $580_1$ through $580_{16}$. The vertical parity symbols are arranged consecutively, from left to right, as columns in the vertical parity words $570_{253}$ through $570_{256}$, starting from the frequency channel $580_1$.

For the sake of example, it is assumed that the information bits transmitted at frequency channels $580_7$, $580_8$, $580_9$ and $580_{10}$ of the words $570_{20}$ through $570_{120}$, and the information bits transmitted at frequency channels $580_1$, $580_2$, $580_3$, $580_4$ and $580_5$ of the words $570_{130}$ through $570_{210}$ would be transmitted in error to the transceiver 30. This transmission error is shown in FIG. 4, and in other related figures, as a corresponding channel symbol that is demarcated by cross-hatching. These select transmission errors in the block 500 represent the phenomenon of multipath fading, in other words, the occurrence of transmission errors at a multitude of frequency channels over extended periods of time.

The processor 36 in step 210 would perform CRC over time on the information symbols in frequency channels $580_1$ through $580_{12}$ for the words $570_1$ through $570_{252}$. Since at least one information symbol is in error for the block 500, the processor 36 would then proceed to step 240 and perform CRC over frequency on the channel symbols in frequency channels $580_1$ through $580_{16}$, using the vertical parity bits in the vertical parity words $570_{253}$ through $570_{256}$. The processor 36 would determine that an information symbol is in error in frequency channels $580_1$, $580_2$, $580_3$, $580_4$ and $580_5$ and in frequency channels $580_7$, $580_8$, $580_9$ and $580_{10}$, in other words, that there are nine failing frequency channels.

Since the number of failing frequency channels exceeds the number of correctable erasures, four, FEC cannot be performed on the words in the block 500. The ARQ/FEC process 200 provides a technique to avoid having to resort to ARQ at this point. The processor 36 would perform step 290 and request, as part of a first ARQ/FEC iteration, the retransmission of partial vertical parity bits for frequency channels $580_1$ through $580_5$ and frequency channels $580_7$ through $580_{10}$, because an information symbol at these frequency channels would have been detected in error in step 240. These partial vertical parity bits would be used by the processor 36 for performing CRC over frequency on frequency channels $580_1$, $580_2$, $580_3$, $580_4$, $580_6$, $580_7$, $580_8$, $580_9$ and $580_{10}$. For the sake of this example, it is assumed that the data in memory 38 initially indicates that the frequency channels $580_1$ through $580_{16}$ are working channels, and that the retransmitted block of data bits including the partial vertical parity bits is retransmitted correctly pursuant to the retransmission process 400 that is performed as part of steps 290 and 390 of the process 200.

The performance of CRC over frequency in step 300 on the words of the block 500, using the retransmitted partial vertical parity bits for the first ARQ/FEC iteration, would provide for the subdivision of the block 500, as the block under evaluation, into an error subblock 510 and an error subblock 520. The error subblock 510 and the error subblock 520 are shown, respectively, in FIGS. 4A and 4B. The error subblock 510 is comprised of the words $570_1$ through $570_{128}$, and the error subblock 520 is comprised of the words $570_{129}$ through $570_{252}$. The processor 36 stores data in the memory 38 that is obtained as a result of the performance of CRC over frequency on the error subblocks 510 and 520 using the retransmitted partial vertical parity bits.

The processor 36 would then determine in step 310 that there are four failing frequency channels in the error subblock 510, and therefore proceed to perform step 320. In step 320, the processor 38 would perform FEC on the words $570_{20}$ through $570_{100}$ of the error subblock 510 using the respective horizontal parity symbols in frequency channels $580_{13}$, $580_{14}$, $580_{15}$ and $580_{16}$ to correct the errors in the information symbols at frequency channels $580_7$ though $580_{10}$. For instance, the horizontal parity symbols in the frequency channels $580_{13}$, $580_{14}$, $580_{15}$ and $580_{16}$ of the word 57020 would be used to correct the errors in the information symbols in the frequency channels $580_7$, $580_8$, $580_9$ and $580_{10}$ of the word $570_{20}$. Thus, the words in the subblock 510 are corrected by the retransmission of a small number of parity bits. At this point, the performance of the process 200 has accomplished the result that the entire block 500 need not be retransmitted by ARQ to obtain a correct transmission.

After correcting all the words in the error subblock 510 that have information symbols in error, the processor 36 would then in step 320 update the running sums in the memory 38 to indicate that the frequency channels $580_7$, $580_8$, $580_9$ and $580_{10}$ have been failing for eighty-one consecutive words.

The processor 36 would then determine in step 340 that the error subblock 520, as defined in step 300 during the fast ARQ/FEC iteration for the block 500, has not yet been evaluated. The processor 36 would then determine in step 310 that the failing frequency channels for the error subblock 520 exceeds the number of correctable erasures and, therefore, proceed to step 350 after performing step 340. As both subblocks have been evaluated, the processor 36 would proceed to step 360. Although no error subblock is corrected during the performance of the first ARQ/FEC iteration of the process 200 on the block 500, the advantage of subdividing the transmission block into smaller blocks is evident, as the probability of specifically identifying transmission errors increases when a smaller number of bits is evaluated.

Returning to the example, in step 360, the processor 36 would determine that only one ARQ/FEC iteration has been performed. For purposes of this example, the selected iteration limit is equal to three. Therefore, the processor 36 would proceed to perform step 290 after incrementing the ARQ/FEC iteration count to two in the memory 38 in step 363. In step 290, the processor 36 would request the retransmission of partial vertical parity bits for failing frequency channels $580_1$ through $580_5$ of the error subblock 520. The processor 36 in step 300 would use these partial vertical parity bits to subdivide the error subblock 520 into an error subblock 530 and an error subblock 540, as shown in FIGS. 4C and 4D, respectively. The error subblock 530 would comprise words $570_{127}$ through $510_{190}$, and the error subblock 540 would comprise words $570_{191}$ through $570_{252}$.

The processor 36 would then determine in step 310 that the five failing frequency channels in the error subblock 530 exceeds the four correctable erasures. Therefore, the processor 36 would perform step 340, and then proceed to step 310 after determining that the error subblock 540 has not been evaluated.

The processor 36 would then perform step 310 on the error subblock 540, and obtain the same result as that obtained for the error subblock 530. After performing step 340, the processor would proceed from step 350 to step 360 because the error subblock 530 and the error subblock 540 are not correctable by FEC.

Figure 4E:
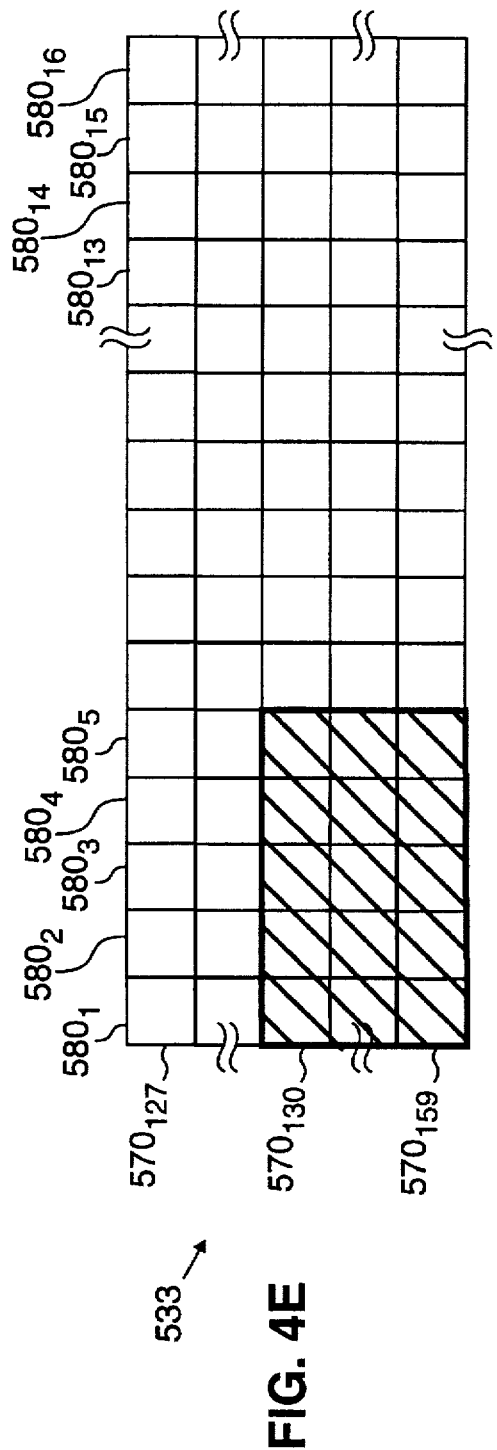
FIG. 4E is a further subdivision of the first subdivision of the second error subblock shown in FIG. 4C.
Figure 4F:
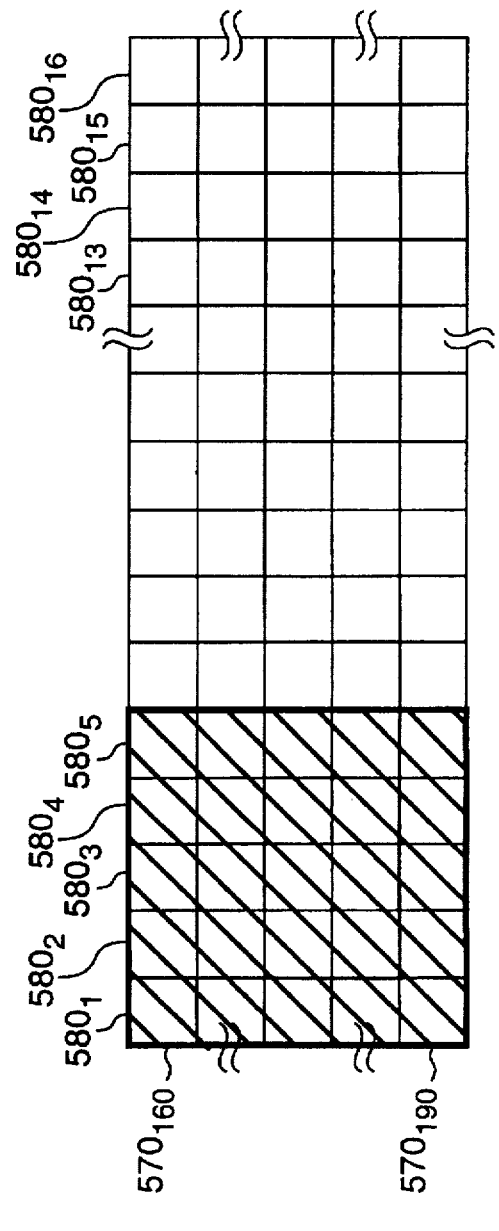
FIG. 4F is a further subdivision of the first subdivision of the second error subblock shown in FIG. 4C.

A third ARQ/FEC iteration would thereafter be performed. In step 290, the processor 36 would request the retransmission of partial vertical parity bits for failing frequency channels $580_1$ through $580_5$ of the error subblocks 530 and 540, the blocks under evaluation. The processor 36 in step 300 would use these partial vertical parity bits to subdivide the error subblock 530 into an error subblock 533 and an error subblock 535, as shown in FIGS. 4E and 4F, respectively. The error subblock 533 would comprise words $570_{127}$ through $510_{159}$, and the error subblock 535 would comprise words $570_{160}$ through $570_{190}$. In addition, the processor 36 in step 300 would use these partial vertical parity bits to subdivide the error subblock 540 into an error subblock 543 and an error subblock 545, as shown in FIGS. 4G and 4H, respectively. The error subblock 543 would comprise words $570_{191}$ through $510_{221}$, and the error subblock 545 would comprise words $570_{222}$ through $570_{252}$.

The processor 36 would then determine in step 310 that the five failing frequency channels in each of the error subblocks 533, 535 and 543 exceeds the number of correctable erasures. For the error subblock 545, the processor 36 would perform steps 310, 320 and 330, although no running sums would actually be updated as no frequency channels are in error in the error subblock 545. The elimination of the words in error subblock 545 as possible candidate words containing transmission errors, thus, reduces the number of bits that would have to otherwise be retransmitted using ARQ because they are not correctable by FEC.

After all four error subblocks have been evaluated pursuant to steps 310 through 350, the processor 36 would then proceed to step 390, because it would determine that the ARQ/FEC limitation has been reached. In step 390, the processor 36 would request the retransmission of information bits for the words of error subblocks 533, 535 and 543 using the steps of the process 400, as explained above, to obtain a correct retransmission of information bits. The processor 36 would increment the running sums for frequency channels $580_1$ through $580_5$ accordingly to represent the ninety-six words for which errors were detected. The processor 36 then in step 230 would determine new working frequency channels for the transmission of another transmission block of data bits based on the running sums updated during the processing of block 500.

In sum, the performance of the process 200 on the block 500 would result in the correction of the detected errors in the words of subblock 510 using the retransmitted parity bits and the elimination of the need for retransmitting the information bits in the subblock 545. Thus, the performance of ARQ for the block 500 would result in the retransmission of fewer bits, thereby increasing the rate of data transmission.

Figure 5:
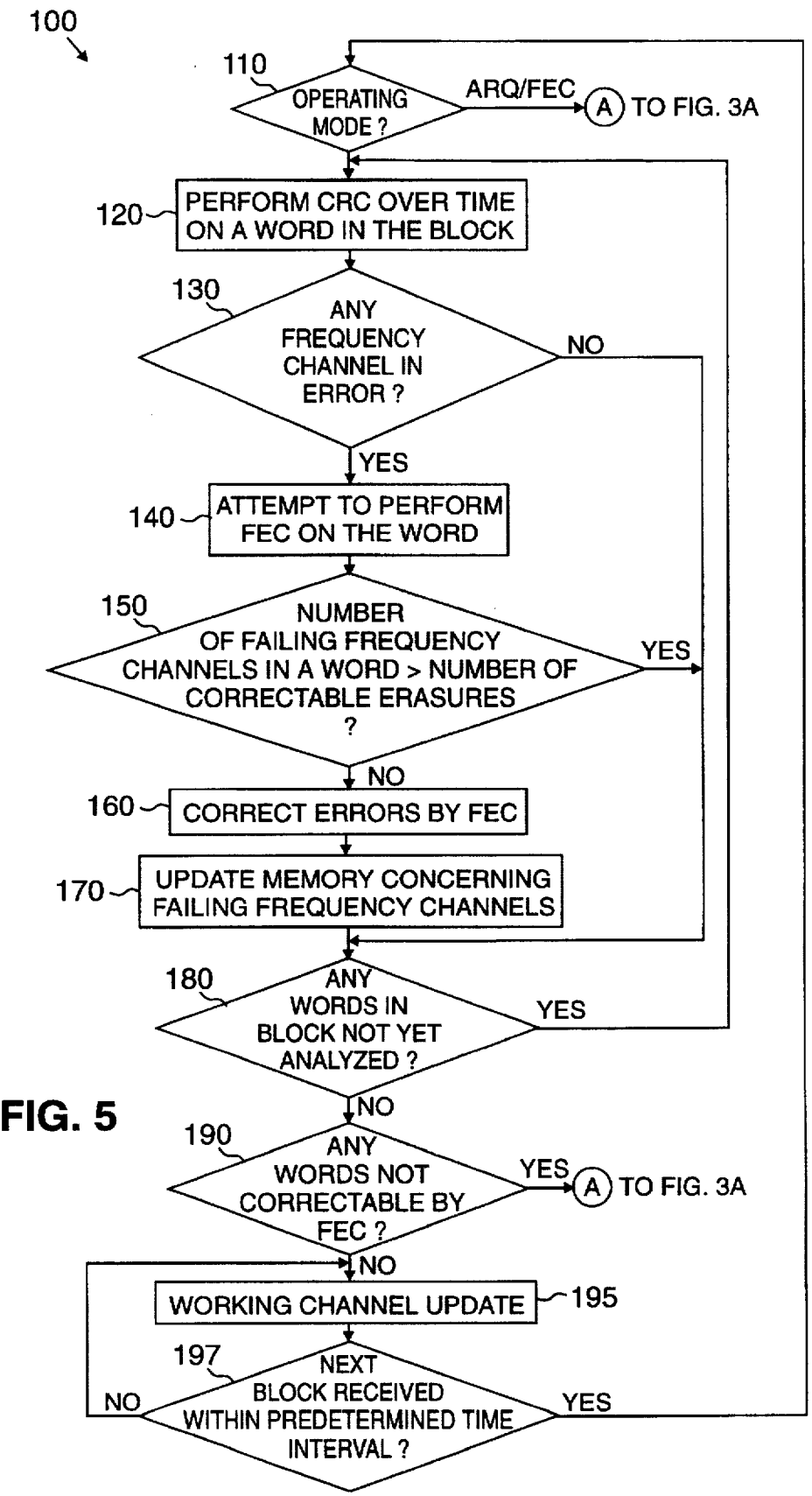
FIG. 5 is a flow diagram illustrating the method of correcting transmission errors in the individual words of the transmission block that may be performed prior to the method of FIGS. 3A and 3B.

A second embodiment of the invention is now described with respect to the system 10. An option is provided for the processor 36 to attempt first to perform FEC on the words in a transmission block that are detected as having an information symbol in error, before determining whether the adaptive ARQ/FEC process 200 should be performed on the transmission block. This embodiment is implemented by the performance of the steps of the FEC-word process 100, which is shown in FIG. 5. After completing the process 100, the processor 36 either begins to perform the adaptive ARQ/FEC process 200 starting from step 210, or attempts to process another transmission block according to the process 100, as explained below.

In step 110, the processor 36 determines whether the FEC-word process 100 is selected for performance before the ARQ/FEC process 200. If the processor 36 is preprogrammed to perform the FEC-word process 100, the processor 36 performs the process 1130, beginning with step 120, as explained in detail below. On the other hand, if the FEC-word process 100 is not selected, the processor 36 begins performing the ARQ/FEC process 200 from step 240.

In this embodiment, the processor 36 is programmed using conventional techniques to perform step 110 of the process 100 each time after it performs step 235 of the process 200.

In step 120, the processor 36 performs CRC over time for the individual words in the transmission block in the order in which the words that contain information symbols are received at the transceiver 30. The processor 36 stores data in the memory 38 concerning the results of step 120. For example, for the block 500, CRC over time would be performed starting from the word $570_1$ and, continuing consecutively, through word $570_{252}$. For each word analyzed in step 120, the processor 36 in step 130 determines whether any of the channel symbols in that word are received in error. If the processor 36 determines that at least one channel symbol is detected in error, the processor 36 in step 140 attempts to perform FEC on that word. If, on the other hand, no channel symbol is in error for that word, then the processor 36 performs step 180, as explained below.

In step 140, the processor 36 attempts to perform FEC on a word in the transmission block that is detected as having at least one channel symbol in error. If the processor 36 in step 150 determines that the number of failing frequency channels in that word exceeds the number of correctable errors, the processor 36 proceeds to step 180. The number of correctable errors per word using horizontal parity symbols cannot exceed the largest integer less than or equal to one-half the number of frequency channels allocated to horizontal parity symbols for a word in the transmission block.

On the other hand, if the processor 36 in step 150 determines that the number of failing frequency channels in the word does not exceed the number of correctable errors, then the processor 36 in step 160 performs FEC on the information symbols in that word. The processor 36 performs FEC using the horizontal parity symbols of the word to correct the errors in the information symbols at the individual frequency channels of that word. Then, in step 170, the processor 36 updates the running sums in the memory 38 in the same manner as explained above for steps 270 and 330 of the process 200, and proceeds to step 180.

The processor 36 in step 180 determines whether any words in the transmission block have not yet been evaluated. If any such word remains, the processor 36 then performs step 120, and the subsequent steps that follow, on that word and any remaining words in the transmission block in the manner described above.

After the processor 36 determines in step 180 that all words in the transmission block have been evaluated, the processor 36 determines in step 190 whether any word in the transmission block could not be corrected by FEC. If at least one word has not been corrected by FEC, the processor 36 then starts to perform the adaptive ARQ/FEC process 200 on the transmission block starting from step 240. As explained above, the processor 36 stores data in the memory 38 concerning whether step 110 of the process 100 is to be performed prior to the ARQ/FEC process 200 for subsequent transmission blocks.

If none of the words of the transmission block has not been correctable by FEC, the processor 36 then performs step 195. In step 195, the processor 36 determines which frequency channels should be used as a working frequency channel. Step 195 of the process 100 is performed in the same manner as step 230 of the process 200. Thereafter, in step 197, the processor 36 attempts to retrieve the next transmission block from the memory 38. Step 197 of the process 100 is performed in the same manner as step 235 of the process 200. When a subsequent transmission block is received and stored in the memory 38, the processor 36 then returns to step 110.

It is to be understood that the embodiments and variations shown and described above are illustrative of the principles of this invention only and that various modifications may be implemented by those skilled in the art without departing from the scope and spirit of the invention.

I claim:

1. A method for detecting and correcting the data transmission errors that may occur during multitone transmission, comprising the steps of:
   transmitting over a plurality of frequency channels a plurality of words comprised of (i) information words that comprise a plurality of information and horizontal parity checking bits, and (ii) vertical parity words that comprise a plurality of vertical parity checking bits;
   receiving from the transmitter a multitone transmission block comprised of said plurality of words;
   mapping said information bits, horizontal parity checking bits and vertical parity checking bits, respectively, as a plurality of information symbols, horizontal parity symbols and vertical parity symbols at their respective frequency channels of transmission;
   performing cyclic redundancy checking (CRC) over time on the plurality of information words, using the respective plurality of horizontal parity symbols, to detect the presence of a transmission error in any of the plurality of information words;
   performing CRC over frequency on the plurality of information words, using the plurality of vertical parity bits transmitted at the plurality of frequency channels, to detect at which of the plurality of frequency channels there is a transmission error, where the performance of CRC over time on the plurality of information words detected the presence of a transmission error in any of the plurality of information words; and,
   requesting that the transmitter retransmit partial vertical parity bits for any frequency channel in the transmission block that is detected as having a transmission error, where the number of frequency channels detected as having a transmission error in the transmission block exceeds the number of frequency channels in the transmission block, which have a transmission error, that can be corrected by forward error correction (FEC).

2. The method of claim 1, further comprising the step of:
   performing CRC over frequency on the information words using the retransmitted partial vertical parity bits to detect the frequency channels that have a transmission error for each of a plurality of error subblocks, wherein an error subblock is comprised of a subset of the plurality of information words of the transmission block and is defined from the performance of CRC over frequency on the transmission block using the retransmitted partial vertical parity bits.

3. The method of claim 2, wherein the partial vertical parity bits are requested to define a first error subblock and a second error subblock.

4. The method of claim 3, wherein the first error subblock and the second error subblock are comprised, respectively, of mutually exclusive subsets of the plurality of information words.

5. The method of claim 2, further comprising the step of:
   performing FEC on an error subblock, where the number of frequency channels detected as having a transmission error, by the performance of CRC over frequency on that error subblock using the respective retransmitted partial vertical parity bits, does not exceed the number of frequency channels in that error subblock that have a transmission error which can be corrected by FEC using the horizontal parity symbols of that error subblock.

6. The method of claim 5, further comprising the steps of:

requesting that the transmitter retransmit partial vertical parity bits for any frequency channel of any error subblock which was defined as a result of the previous retransmission of partial vertical parity bits and which could not be corrected by FEC;

performing CRC over frequency using the most recently retransmitted partial vertical parity bits on any error subblock for which partial vertical parity bits were most recently retransmitted to detect the frequency channels that have a transmission error in a plurality of error subblocks which are defined from the performance of CRC over frequency on the error subblocks for which partial vertical parity bits were most recently retransmitted; and, performing FEC on an error subblock defined from the most recent performance of CRC over frequency, where the number of frequency channels detected as having a transmission error, by the performance of CRC over frequency on that error subblock using the respective retransmitted partial vertical parity bits, does not exceed the number of frequency channels in that error subblock that have a transmission error which can be corrected by FEC using the horizontal parity symbols of that error subblock.

7. The method of claim 6, further comprising the step of:

repeatedly performing the steps of requesting partial parity bits, performing CRC over frequency and performing FEC on the mostly recently formed error subblock for a predetermined number of iterations.

8. The method of claim 7, wherein the predetermined number of iterations is equal to three.

9. The method of claim 7, further comprising the step of: requesting that the transmitter retransmit by automatic repeat request the information bits of an error subblock that cannot be corrected by FEC, when the iteration limit is reached.

10. A method for adaptively changing which frequency channels, of a plurality of available frequency channels that may be used by a transmitter for the transmission of data bits in a multitone transmission system which transmits blocks of information utilizing a plurality of frequency channels, are to be used for the transmission of data bits during the course of the processing of multitone transmission blocks by a receiver, comprising the steps of:

detecting the transmission errors that occur at each of the plurality of frequency channels by performing error checking over time and frequency on a multitone transmission block;

storing in a memory data representative of the frequency channels detected in error as a plurality of running sums;

processing the values of the running sums to determine which, if any, of the plurality of frequency channels are to be used for data transmission;

transmitting an acknowledgement from the receiver to the transmitter indicating the frequency channels to be used for data transmission; and adaptively changing the frequency channels used by the transmitter based on the acknowledgment signal.

11. An apparatus for adaptively changing which frequency channels, of a plurality of available frequency channels that may be used for the transmission of data bits in a multitone transmission system which transmits blocks of information utilizing a plurality of frequency channels, are to be used by a transmitter for the transmission of data bits during the course of the processing of multitone transmission blocks received by a receiver comprising:

a processor in said receiver to perform cyclic redundancy checking over time and frequency on a multitone transmission block in order to detect the transmission errors that occur at each of the plurality of frequency channels;

a memory in said receiver to store data representative of the detected frequency channels in error as a plurality of running sums;

said processor determining based on the values of the running sums which, if any of the plurality of frequency channels are to be used for data transmission; and a transmission means in said receiver for transmitting to said transmitter an acknowledgement indicating the frequency channels to be used for data transmission.

12. A system for detecting and correcting the data transmission errors that may occur during multitone transmission, comprising:

a transmitter for transmitting over a plurality of frequency channels a plurality of words comprised of (i) information words that comprise a plurality of information and horizontal parity checking bits, and (ii) vertical parity words that comprise a plurality of vertical parity checking bits;

a receiver for receiving from the transmitter a multitone transmission block comprised of said plurality of words; and, said receiver further comprising a processor, wherein said processor maps said information bits, horizontal parity checking bits and vertical parity checking bits, respectively, as a plurality of channel symbols comprising information symbols, horizontal parity symbols and vertical parity symbols at their respective frequency channels of transmission, wherein said processor performs cyclic redundancy checking (CRC) over time on the plurality of information words, using the respective plurality of horizontal parity symbols, to detect the presence of a transmission error in any of the plurality of channel symbols, wherein said processor performs CRC over frequency on the plurality of information words, using the plurality of vertical parity bits transmitted at the plurality of frequency channels, to detect at which of the plurality of frequency channels there is a transmission error, where the performance of CRC over time on the plurality of information words detected the presence of a transmission error in any of the plurality of channel symbols, and wherein said processor requests that the transmitter retransmit partial vertical parity bits for any frequency channel in the transmission block that is detected as having a transmission error, where the number of frequency channels that is detected as having a transmission error in the transmission block exceeds the number of frequency channels in the transmission block, which have a transmission error, that can be corrected by forward error correction (FEC).

13. The system of claim 12, wherein said processor performs CRC over frequency on the information words using the retransmitted partial vertical parity bits to detect the frequency channels that have a transmission error in each of a plurality of error subblocks, wherein each said error subblock is comprised of a subset of the plurality of information words of the transmission block and is defined from the performance of CRC over frequency on the transmission block using the retransmitted partial vertical parity bits.

14. The system of claim 13, wherein the partial vertical parity bits are requested to define a first error subblock and a second error subblock.

15. The system of claim 14, wherein the first error subblock and the second error subblock are comprised, respectively, of mutually exclusive subsets of the plurality of information words.

16. The system of claim 12, wherein the processor performs FEC on an error subblock where the number of frequency channels detected as having a transmission error, by the performance of CRC over frequency on that error subblock using the respective retransmitted partial vertical parity bits, does not exceed the number of frequency channels in that error subblock that have a transmission error which can be corrected by FEC using the horizontal parity symbols of that error subblock.

17. The system of claim 16, wherein the processor requests that the transmitter retransmit partial vertical parity bits for any frequency channel of any error subblock which was defined as a result of the previous retransmission of partial vertical parity bits and which could not be corrected by FEC;

wherein the processor performs CRC over frequency using the most recently retransmitted partial vertical parity bits on any error subblock for which partial vertical parity bits were most recently retransmitted to detect the frequency channels that have a transmission error in a plurality of error subblocks which are defined from the performance of CRC over frequency on the error subblocks for which partial vertical parity bits were most recently retransmitted; and, wherein the processor performs FEC on an error subblock defined from the most recent performance of CRC over frequency, where the number of frequency channels detected as having a transmission error by the performance of CRC over frequency on that error subblock using the respective retransmitted partial vertical parity bits does not exceed the number of frequency channels in the words of that error subblock that have a transmission error which can be corrected by FEC using the horizontal parity symbols of that error subblock.

18. The system of claim 17, wherein the processor repeatedly performs the steps of requesting partial parity bits, performing CRC over frequency and performing FEC on the mostly recently formed error subblock for a predetermined number of iterations.

19. The system of claim 18, wherein the predetermined number of iterations is equal to three.

20. The system of claim 18, wherein the processor requests that the transmitter retransmit by automatic repeat request the information bits of an error subblock that cannot be corrected by FEC, when the iteration limit is reached.

21. A method for correcting the data transmission errors that may occur during multitone transmission from a transmitter in a multitone transmission system wherein blocks of information are transmitted utilizing a plurality of frequency channels, comprising the steps of:

transmitting a plurality of words over a plurality of frequency channels as a multitone transmission block, wherein said plurality of words is comprised of (i) information words that comprise a plurality of information and horizontal parity checking bits, and (ii) vertical parity words that comprise a plurality of vertical parity checking bits;

receiving a request for the transmission of partial vertical parity bits, wherein said requested partial vertical parity bits provide information for detecting an error in a frequency channel in the multitone transmission block that may be detected as having a transmission error; and, retransmitting the requested partial vertical parity bits.

22. The method of claim 21, further comprising the steps of:

receiving a request for the transmission of partial vertical parity bits for any frequency channel of any error subblock which was defined as a result of the previous retransmission of partial vertical parity bits and which could not be corrected by forward error correction (FEC); and retransmitting the currently requested partial vertical parity bits.

23. The method of claim 21, further comprising the steps of:

receiving a request for the retransmission of information bits of an error subblock that cannot be corrected by FEC; and retransmitting the requested information bits.

24. An apparatus for correcting the data transmission errors that may occur during multitone transmission in a multitone transmission system wherein blocks of information are transmitted utilizing a plurality of frequency channels, comprising:

a means for transmitting a plurality of words over a plurality of frequency channels as a multitone transmission block, wherein said plurality of words is comprised of (i) information words that comprise a plurality of information and horizontal parity checking bits, and (ii) vertical parity words that comprise a plurality of vertical parity checking bits; and, a means for receiving a request for the transmission of partial vertical parity bits, wherein said requested partial vertical parity bits provide information for detecting an error in a frequency channel in the multitone transmission block that may have been detected as having a transmission error; and, a means for processing the request for partial vertical parity bits, such that said means for transmitting retransmits the requested partial vertical parity bits.

25. The apparatus of claim 24, wherein said means for receiving may receive a request for the retransmission of information bits of an error subblock that cannot be corrected by FEC, and wherein said means for retransmitting retransmits the requested information bits upon receipt of said request for information bits.

26. A method for detecting and correcting the data transmission errors that may occur during multitone transmission to a receiver, comprising the steps of:

receiving a transmission block comprised of a plurality of words transmitted over a plurality of frequency channels, wherein said plurality of words is comprised of (i) information words that comprise a plurality of information and horizontal parity checking bits, and (ii) vertical parity words that comprise a plurality of vertical parity checking bits;

mapping said information bits, horizontal parity checking bits and vertical parity checking bits, respectively, as a plurality of channel symbols comprising information symbols, horizontal parity symbols and vertical parity symbols at their respective frequency channels of transmission;

performing cyclic redundancy checking (CRC) over time on the plurality of information words, using the respective plurality of horizontal parity symbols, to detect the presence of a transmission error in any of the plurality of channel symbols;

performing CRC over frequency on the plurality of information words, using the plurality of vertical parity bits transmitted at the plurality of frequency channels, to detect at which of the plurality of frequency channels there is a transmission error, where the performance of CRC over time on the plurality of information words detected the presence of a transmission error in any of the plurality of channel symbols; and, requesting the retransmission of partial vertical parity bits for any frequency channel in the transmission block that is detected as having a transmission error, where the number of frequency channels that is detected as having a transmission error in the transmission block exceeds the number of frequency channels in the transmission block, which have a transmission error, that can be corrected by forward error correction (FEC).

27. The method of claim 26, further comprising the step of:

performing CRC over frequency on the information words using the retransmitted partial vertical parity bits to detect the frequency channels that have a transmission error in each of a plurality of error subblocks, wherein each said error subblock is comprised of a subset of the plurality of information words of the transmission block and is defined from the performance of CRC over frequency on the transmission block using the retransmitted partial vertical parity bits.

28. The method of claim 26, wherein the partial vertical parity bits are requested to define a first error subblock and a second error subblock.

29. The method of claim 28, wherein the first error subblock and the second error subblock are comprised, respectively, of mutually exclusive subsets of the plurality of information words.

30. The method of claim 26, further comprising the step of:

performing FEC on an error subblock where the number of frequency channels detected as having a transmission error, by the performance of CRC over frequency on that error subblock using the respective retransmitted partial vertical parity bits, does not exceed the number of frequency channels in that error subblock that have a transmission error which can be corrected by FEC using the horizontal parity symbols of that error subblock.

31. The method of claim 30, further comprising the steps of:

requesting transmission of partial vertical parity bits for any frequency channel of any error subblock which was defined as a result of the previous retransmission of partial vertical parity bits and which could not be corrected by FEC;

performing CRC over frequency using the most recently retransmitted partial vertical parity bits on any error subblock for which partial vertical parity bits were most recently retransmitted to detect the frequency channels that have a transmission error in a plurality of error subblocks which are defined from the performance of CRC over frequency on the error subblocks for which partial vertical parity bits were most recently retransmitted; and, performing FEC on an error subblock defined from the most recent performance of CRC over frequency, where the number of frequency channels detected as having a transmission error by the performance of CRC over frequency on that error subblock using the respective retransmitted partial vertical parity bits does not exceed the number of frequency channels in the words of that error subblock that have a transmission error which can be corrected by FEC using the horizontal parity symbols of that error subblock.

32. The method of claim 31, further comprising the step of:

repeatedly performing the steps of requesting partial parity bits, performing CRC over frequency and performing FEC on the mostly recently formed error subblock for a predetermined number of iterations.

33. The method of claim 32, wherein the predetermined number of iterations is equal to three.

34. The method of claim 32 further comprising the step of:

requesting the retransmission of the information bits of an error subblock that cannot be corrected by FEC, when the iteration limit is reached.

35. An apparatus for detecting and correcting the data transmission errors that may occur during multitone transmission, comprising:

a means for receiving a transmission block comprised of a plurality of words transmitted over a plurality of frequency channels, wherein said plurality of words is comprised of (i) information words that comprise a plurality of information and horizontal parity checking bits, and (ii) vertical parity words that comprise a plurality of vertical parity checking bits;

a processor, wherein said processor maps said information bits, horizontal parity checking bits and vertical parity checking bits, respectively, as a plurality of channel symbols comprising information symbols, horizontal parity symbols and vertical parity symbols at their respective frequency channels of transmission, wherein said processor performs cyclic redundancy checking (CRC) over time on the plurality of information words, using the respective plurality of horizontal parity symbols, to detect the presence of a transmission error in any of the plurality of channel symbols, wherein said processor performs CRC over frequency on the plurality of information words, using the plurality of vertical parity bits transmitted at the plurality of frequency channels, to detect at which of the plurality of frequency channels there is a transmission error, where the performance of CRC over time on the plurality of information words detected the presence of a transmission error in any of the plurality of channel symbols, and wherein said processor requests the retransmission of partial vertical parity bits for any frequency channel in the transmission block that is detected as having a transmission error, where the number of frequency channels that is detected as having a transmission error in the transmission block exceeds the number of frequency channels in the transmission block, which have a transmission error, that can be corrected by forward error correction (FEC).

36. The apparatus of claim 35, wherein said processor performs CRC over frequency on the information words using the retransmitted partial vertical parity bits to detect the frequency channels that have a transmission error in each of a plurality of error subblocks, wherein each said error subblock is comprised of a subset of the plurality of information words of the transmission block and is defined from the performance of CRC over frequency on the transmission block using the retransmitted partial vertical parity bits.

37. The apparatus of claim 35, wherein said processor requests the partial vertical parity bits to define a first error subblock and a second error subblock.

38. The apparatus of claim 37, wherein the first error subblock and the second error subblock are comprised, respectively, of mutually exclusive subsets of the plurality of information words.

39. The apparatus of claim 35, wherein the processor performs FEC on an error subblock where the number of frequency channels detected as having a transmission error, by the performance of CRC over frequency on that error subblock using the respective retransmitted partial vertical parity bits, does not exceed the number of frequency channels in that error subblock that have a transmission error which can be corrected by FEC using the horizontal parity symbols of that error subblock.

40. The apparatus of claim 39, wherein the processor requests that the transmitter retransmit partial vertical parity bits for any frequency channel of any error subblock which was defined as a result of the previous retransmission of partial vertical parity bits and which could not be corrected by FEC;

wherein the processor performs CRC over frequency using the most recently retransmitted partial vertical parity bits on any error subblock for which partial vertical parity bits were most recently retransmitted to detect the frequency channels that have a transmission error in a plurality of error subblocks which are defined from the performance of CRC over frequency on the error subblocks for which partial vertical parity bits were most recently retransmitted; and, wherein the processor performs FEC on an error subblock defined from the most recent performance of CRC over frequency, where the number of frequency channels detected as having a transmission error by the performance of CRC over frequency on that error subblock using the respective retransmitted partial vertical parity bits does not exceed the number of frequency channels in the words of that error subblock that have a transmission error which can be corrected by FEC using the horizontal parity symbols of that error subblock.

41. The apparatus of claim 40, wherein the processor repeatedly performs the steps of requesting partial parity bits, performing CRC over frequency and performing FEC on the mostly recently formed error subblock for a predetermined number of iterations.

42. The apparatus of claim 41, wherein the predetermined number of iterations is equal to three.

43. The apparatus of claim 41, wherein the processor requests the transmission of the information bits of an error subblock that cannot be corrected by FEC, when the iteration limit is reached.

* * * * *